US012633991B2

(12) United States Patent
Khan Beigi et al.

(10) Patent No.: US 12,633,991 B2
(45) Date of Patent: May 19, 2026

(54) METHODS FOR BEAM FAILURE DETECTION AND RECOVERY

(71) Applicant: INTERDIGITAL PATENT HOLDINGS, INC., Wilmington, DE (US)

(72) Inventors: Nazli Khan Beigi, Longueuil (CA); Jonghyun Park, Syosset, NY (US); Moon Il Lee, Melville, NY (US); Paul Marinier, Brossard (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/857,591

(22) PCT Filed: Apr. 17, 2023

(86) PCT No.: PCT/US2023/018819
§ 371 (c)(1),
(2) Date: Oct. 17, 2024

(87) PCT Pub. No.: WO2023/205077
PCT Pub. Date: Oct. 26, 2023

(65) Prior Publication Data
US 2025/0279818 A1 Sep. 4, 2025

Related U.S. Application Data

(60) Provisional application No. 63/332,180, filed on Apr. 18, 2022.

(51) Int. Cl.
*H04B 7/06* (2006.01)
*H04B 7/08* (2006.01)
*H04L 5/00* (2006.01)

(52) U.S. Cl.
CPC ........... *H04B 7/0695* (2013.01); *H04B 7/088* (2013.01); *H04L 5/0048* (2013.01)

(58) Field of Classification Search
CPC ...... H04B 7/0695; H04B 7/088; H04B 7/063; H04B 7/06956; H04L 5/0048; H04L 5/0023; H04W 24/08
See application file for complete search history.

(56) References Cited

U.S. PATENT DOCUMENTS

2021/0297104 A1* 9/2021 Zhou .................... H04B 1/3838
2021/0351838 A1 11/2021 Zhang et al.
2023/0144010 A1* 5/2023 Kwak .................... H04B 7/024
370/329

FOREIGN PATENT DOCUMENTS

WO 2021/207562 10/2021

OTHER PUBLICATIONS

Intel Corporation, "New SID: Study on NR beyond 52.6GHz," 3GPP TSG RAN Meeting #80, RP-181435, La Jolla, USA (Jun. 11-14, 2018).

(Continued)

*Primary Examiner* — Vineeta S Panwalkar
(74) *Attorney, Agent, or Firm* — Volpe Koenig

(57) ABSTRACT

Methods and apparatuses for beam failure detection and recovery (BFR) are described. Methods include a wireless transmit/receive unit: receiving configuration information including BFR parameter sets with respective candidate beam reference signals (RSs), measurement criteria and interference criteria; detecting beam failure; determining a first BFR parameter set based on a priority of the first BFR parameter set, wherein the priority of the first BFR parameter set is determined based on which panel of the plurality of antenna panels is active, or on a received indication; on a condition that at least one candidate beam RS in the set of candidate beam RSs of the first BFR parameter set satisfies (Continued)

WTRU Receives BFD Config. (e.g., BFD Set Monitoring RSes) and BFR Config. of Multiple BFR Parameter Sets (Each Including a Candidate RS Beam List, an RSRP Thresh, a CLI Meas. Threshold) —710

WTRU Detects a Beam Failure based on Monitoring RS(es) from the BFD Set (e.g., Using Active WTRU-Panel) —712

WTRU Selects a First BFR Param. Set and Triggers a BFR —714

716

WTRU Selects a Candidate Beam (If One Exists) From the Selected Param. Set with RSRP > RSRP Thresh and CLI < CLI_Thresh No Candidate Beams in the Selected Param. Set Meet the Criteria WTRU Selects a Second BFR Param. Set (In the Priority Order), e.g., Second WTRU Capability Value Set/ Panel and Activates the Corresponding Panel Candidate Beam Found that Meet the Criteria

718

WTRU Initiates Beam Failure Recovery based on Selected BFR Parameter Set (MAC-CE BFR, or CF-RACH Indicating the Selected Candidate Beam) —720 both the measurement criterion and the interference criterion: selecting a candidate beam RS in the set of candidate beam RSs of the first BFR parameter set that satisfies the measurement criterion and the interference criterion, and indicating the selected candidate beam RS.

18 Claims, 12 Drawing Sheets

(56)                    References Cited

OTHER PUBLICATIONS

Intel Corporation, "New SID: Study on supporting NR from 52.6GHz to 71 Ghz," 3GPP TSG RAN Meeting #86, RP-193259, Sitges, Spain (Dec. 9-12, 2019).
Interdigital, Inc., "Discussion on enhancements of dynamic TDD operations," 3GPP TSG RAN WG1 #109-e, R1-2204070, e-Meeting (May 9-20, 2022).
Interdigital, Inc., "Discussion on potential enhancements on dynamic/ flexible TDD," 3GPP TSG RAN WG1 #111, R1-2211738, Toulouse, France (Nov. 14-18, 2022).
Interdigital, Inc., "On potential enhancements of dynamic and flexible TDD," 3GPP TSG RAN WG1 #110, R1-2205938, Toulouse, France (Aug. 22-26, 2022).
Interdigital, Inc., "Potential enhancements of dynamic and flexible TDD," 3GPP TSG RAN WG1 #110bis-e, R1-2209029, e-Meeting (Oct. 10-19, 2022).
Qualcomm, "New WID on Extending current NR operation to 71 Ghz," 3GPP TSG RAN Meeting #86, RP-193229, Sitges, Spain (Dec. 9-12, 2019).
Third Generation Partnership Project, "Technical Specification Group Radio Access Network; Study on requirements for NR beyond 52.6 GHz (Release 16)," 3GPP TR 38.807 V16.0.0 (Dec. 2019).
Third Generation Partnership Project, "Technical Specification Group Radio Access Network; Study on requirements for NR beyond 52.6 GHz (Release 16)," 3GPP TR 38.807 V16.1.0 (Mar. 2021).
Third Generation Partnership Project, "Technical Specification Group Radio Access Network; Study on Scenarios and Requirements for Next Generation Access Technologies; (Release 17)," 3GPP TR 38.913 V17.0.0 (Mar. 2022).
Third Generation Partnership Project, "Technical Specification Group Radio Access Network; Study on New Radio access technology; 60 GHz unlicensed spectrum (Release 14)," 3GPP TR 38.805 V14.0.0 (Mar. 2017).
Third Generation Partnership Project, "Technical Specification Group Radio Access Network; NR; Medium Access Control (MAC) protocol specification (Release 16)," 3GPP TS 38.321 V16.0.0 (Mar. 2020).
Third Generation Partnership Project, "Technical Specification Group Radio Access Network; NR; Medium Access Control (MAC) protocol specification (Release 17)," 3GPP TS 38.321 V17.0.0 (Mar. 2022).
Third Generation Partnership Project, "Technical Specification Group Radio Access Network; NR; Medium Access Control (MAC) protocol specification (Release 17)," 3GPP TS 38.321 V17.4.0 (Mar. 2023).
Third Generation Partnership Project, "Technical Specification Group Radio Access Network; NR; Physical layer procedures for control (Release 16)," 3GPP TS 38.213 V16.1.0 (Mar. 2020).
Third Generation Partnership Project, "Technical Specification Group Radio Access Network; NR; Physical layer procedures for control (Release 17)," 3GPP TS 38.213 V17.1.0 (Mar. 2022).
Third Generation Partnership Project, "Technical Specification Group Radio Access Network; NR; Physical layer procedures for control (Release 17)," 3GPP TS 38.213 V17.5.0 (Mar. 2023).
Third Generation Partnership Project, "Technical Specification Group Radio Access Network; NR; Radio Resource Control (RRC) protocol specification (Release 16)," 3GPP TS 38.331 V16.0.0 (Mar. 2020).
Third Generation Partnership Project, "Technical Specification Group Radio Access Network; NR; Multiplexing and channel coding (Release 16)," 3GPP TS 38.212 V16.8.0 (Dec. 2021).
Third Generation Partnership Project, "Technical Specification Group Radio Access Network; NR; Radio Resource Control (RRC) protocol specification (Release 16)," 3GPP TS 38.331 V16.12.0 (Mar. 2023).
Third Generation Partnership Project, "Technical Specification Group Radio Access Network; NR; Radio Resource Control (RRC) protocol specification (Release 17)," 3GPP TS 38.331 V17.4.0 (Mar. 2023).
Third Generation Partnership Project, "Technical Specification Group Radio Access Network; NR; Physical channels and modulation (Release 16)," 3GPP TS 38.211 V16.6.0 (Jun. 2021).
Third Generation Partnership Project, "Technical Specification Group Radio Access Network; NR; Physical channels and modulation (Release 17)," 3GPP TS 38.211 V17.1.0 (Dec. 2022).
Third Generation Partnership Project, "Technical Specification Group Radio Access Network; NR; Physical channels and modulation (Release 17)," 3GPP TS 38.211 V17.4.0 (Dec. 2022).
Third Generation Partnership Project, "Technical Specification Group Radio Access Network; NR; Physical layer procedures for data (Release 17)," 3GPP TS 38.214 V17.1.0 (Mar. 2022).
Third Generation Partnership Project, "Technical Specification Group Radio Access Network; NR; Physical layer procedures for data (Release 17)," 3GPP TS 38.214 V17.5.0 (Mar. 2023).

* cited by examiner

Figure 1D:
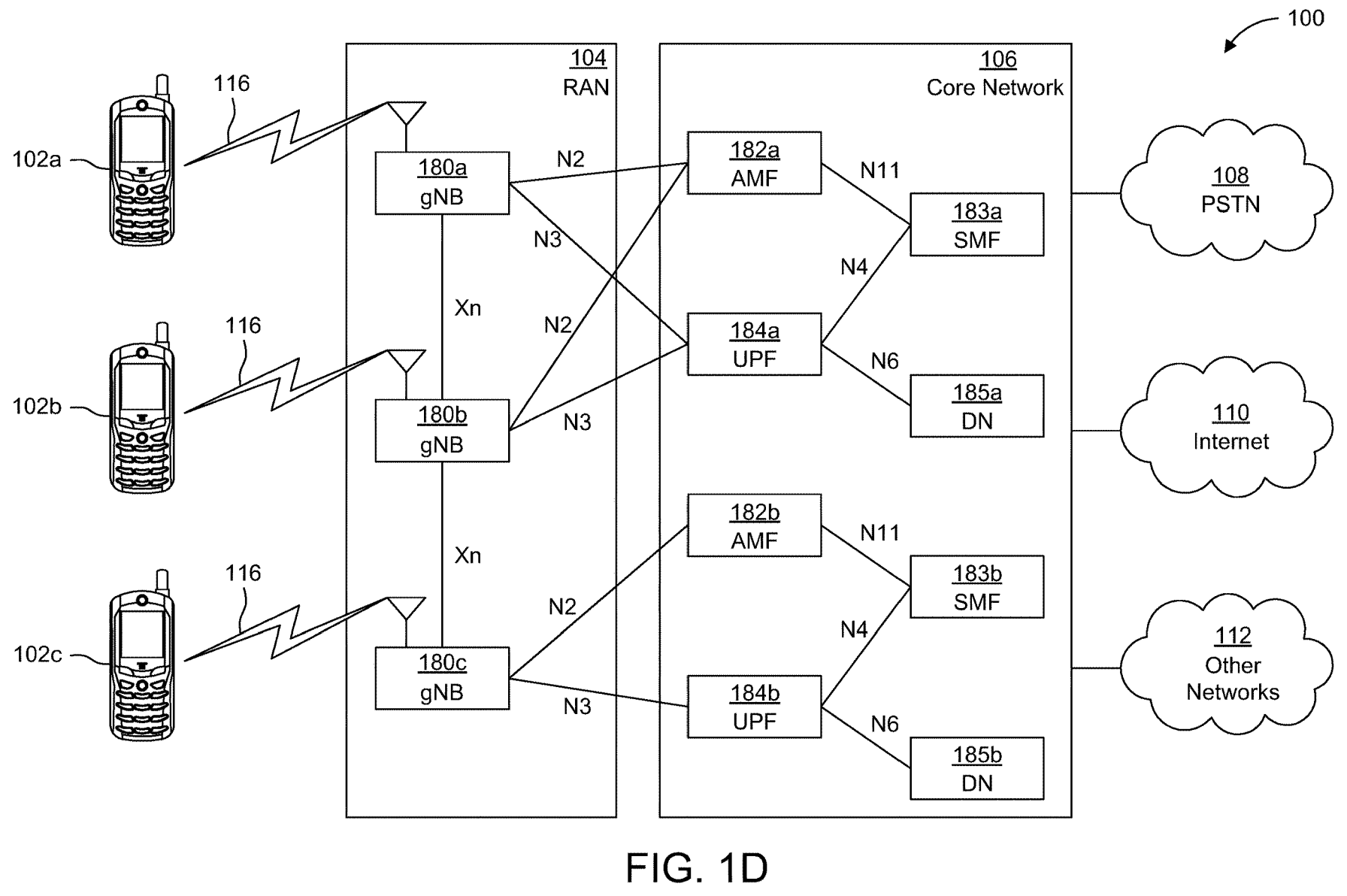

108
PSTN

110
Internet

112
Other
Networks

106
Core Network

183a
SMF

185a
DN

183b
SMF

185b
DN

N11

N4

N6

N11

N4

N6

182a
AMF

184a
UPF

182b
AMF

184b
UPF

104
RAN

N2

N3

N2

N3

N2

N3

180a
gNB

Xn 180b
gNB

Xn 180c
gNB

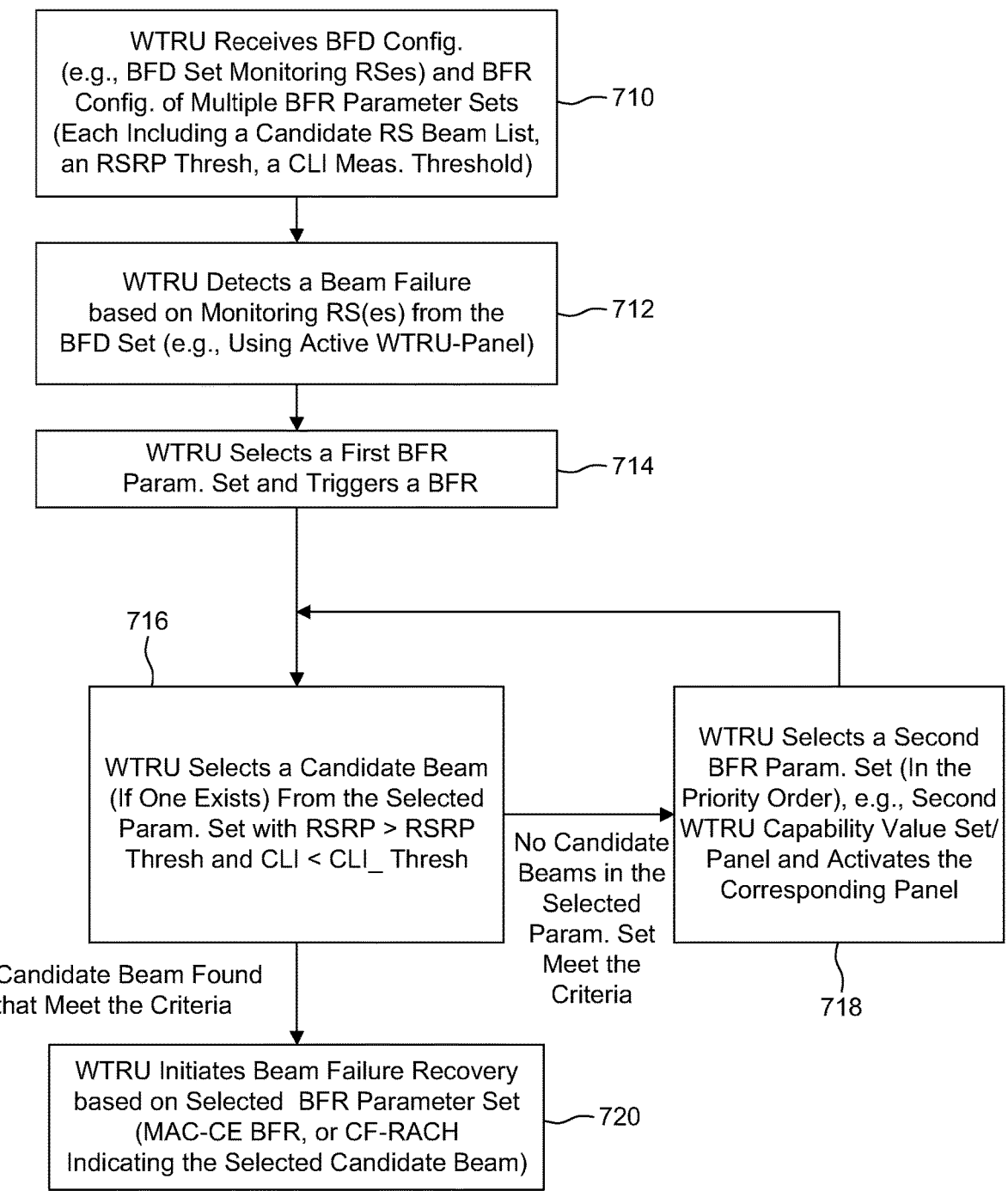

WTRU Receives BFD Config.
(e.g., BFD Set Monitoring RSes) and BFR
Config. of Multiple BFR Parameter Sets
(Each Including a Candidate RS Beam List,
an RSRP Thresh, a CLI Meas. Threshold) —710

WTRU Detects a Beam Failure
based on Monitoring RS(es) from the
BFD Set (e.g., Using Active WTRU-Panel) —712

WTRU Selects a First BFR
Param. Set and Triggers a BFR —714

716

WTRU Selects a Candidate Beam
(If One Exists) From the Selected
Param. Set with RSRP > RSRP
Thresh and CLI < CLI_ Thresh No Candidate
Beams in the
Selected
Param. Set
Meet the
Criteria WTRU Selects a Second
BFR Param. Set (In the
Priority Order), e.g., Second
WTRU Capability Value Set/
Panel and Activates the
Corresponding Panel

718

Candidate Beam Found
that Meet the Criteria

WTRU Initiates Beam Failure Recovery
based on Selected BFR Parameter Set
(MAC-CE BFR, or CF-RACH
Indicating the Selected Candidate Beam) —720

FIG. 7

METHODS FOR BEAM FAILURE DETECTION AND RECOVERY

CROSS-REFERENCE TO RELATED APPLICATIONS

This application is the U.S. National Stage, under 35 U.S.C. § 371, of International Application No. PCT/US2023/018819 filed Apr. 17, 2023, which claims the benefit of U.S. Provisional Application No. 63/332,180, filed Apr. 18, 2022, the contents of which are incorporated herein by reference.

BACKGROUND

Third Generation Partnership Project (3GPP) New Radio (NR) for wireless communications provides for duplex operation to be implemented. Such technology may provide a foundation for the improvement of conventional time division duplexing (TDD) operation, for example, by enhancing uplink (UL) coverage, improving capacity and reducing latency. Conventional TDD may be implemented, for example, by splitting the time domain between the uplink and downlink. The feasibility of allowing full duplex, or more specifically, cross division duplex (XDD) that is sub-band non-overlapping full duplex at the base station (BS) side within a conventional TDD band is under investigation.

SUMMARY

Methods and apparatuses for beam failure detection and recovery are provided herein. A method of beam failure detection performed by a wireless transmit receive unit (WTRU) may include: receiving configuration information that includes a plurality of beam failure recovery (BFR) parameter sets wherein each BFR parameter set includes a respective set of candidate beam reference signals (RSs), a measurement (RSRP) criteria and an interference (CLI) criteria; detecting a beam failure; determining a first BFR parameter set from the plurality of BFR parameter sets based on a priority of the first BFR parameter set, wherein the priority of the first BFR parameter set is determined based on which panel is active, or based on a received indication; and on a condition that at least one candidate beam RS in the set of candidate beam RSs of the first BFR parameter set satisfies both the measurement and interference criteria: selecting a candidate beam RS in the set of candidate beam RSs of the first BFR parameter set that satisfies the measurement and interference criteria, and sending an indication indicating the selected candidate beam RS.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN)

Figure 1A:
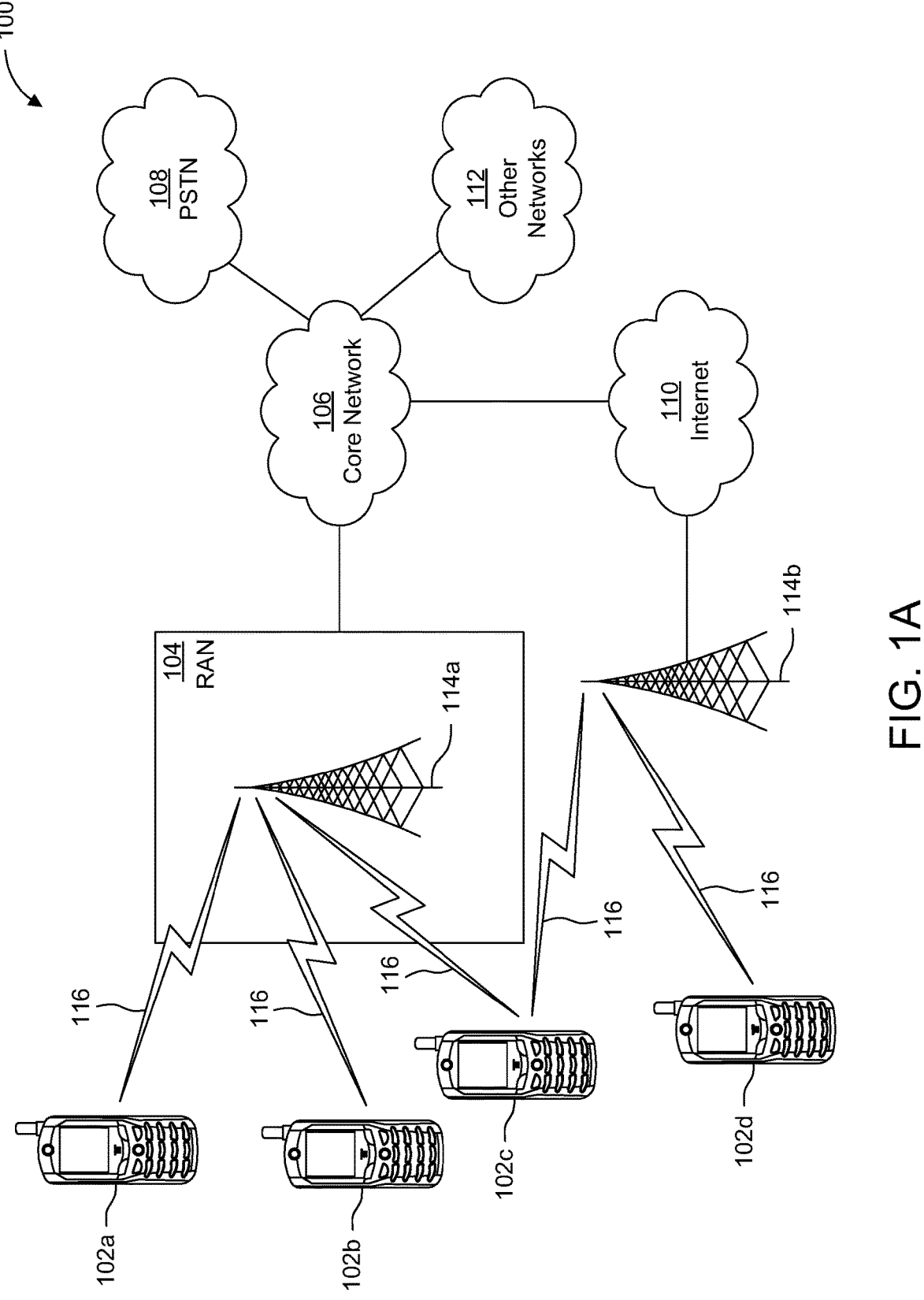
FIG. 1A is a system diagram illustrating an example communications system in which one or more disclosed embodiments may be implemented.
Figure 2:
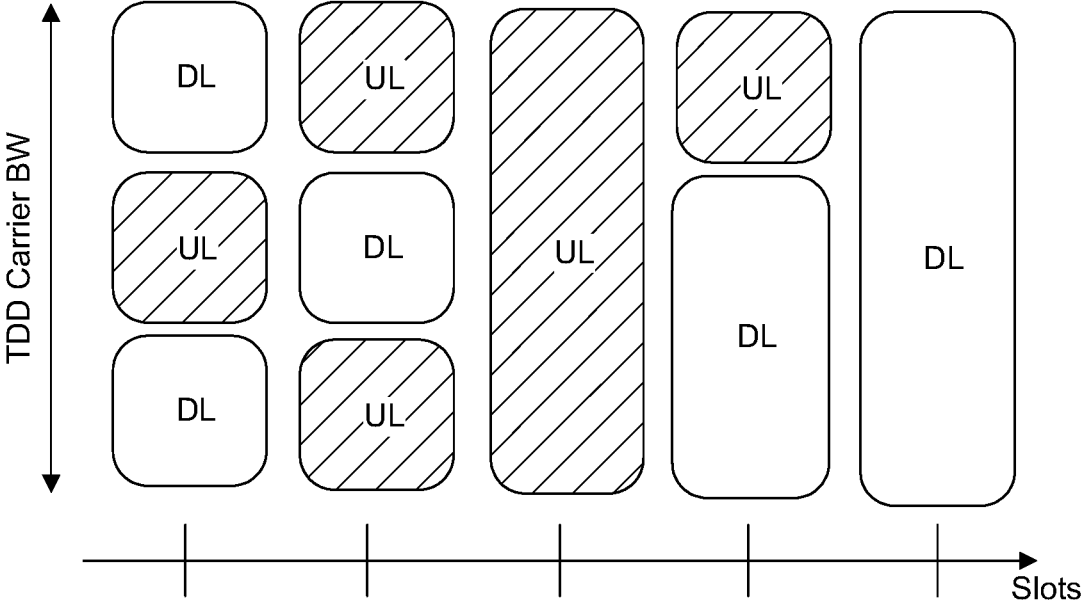
Figure 3:
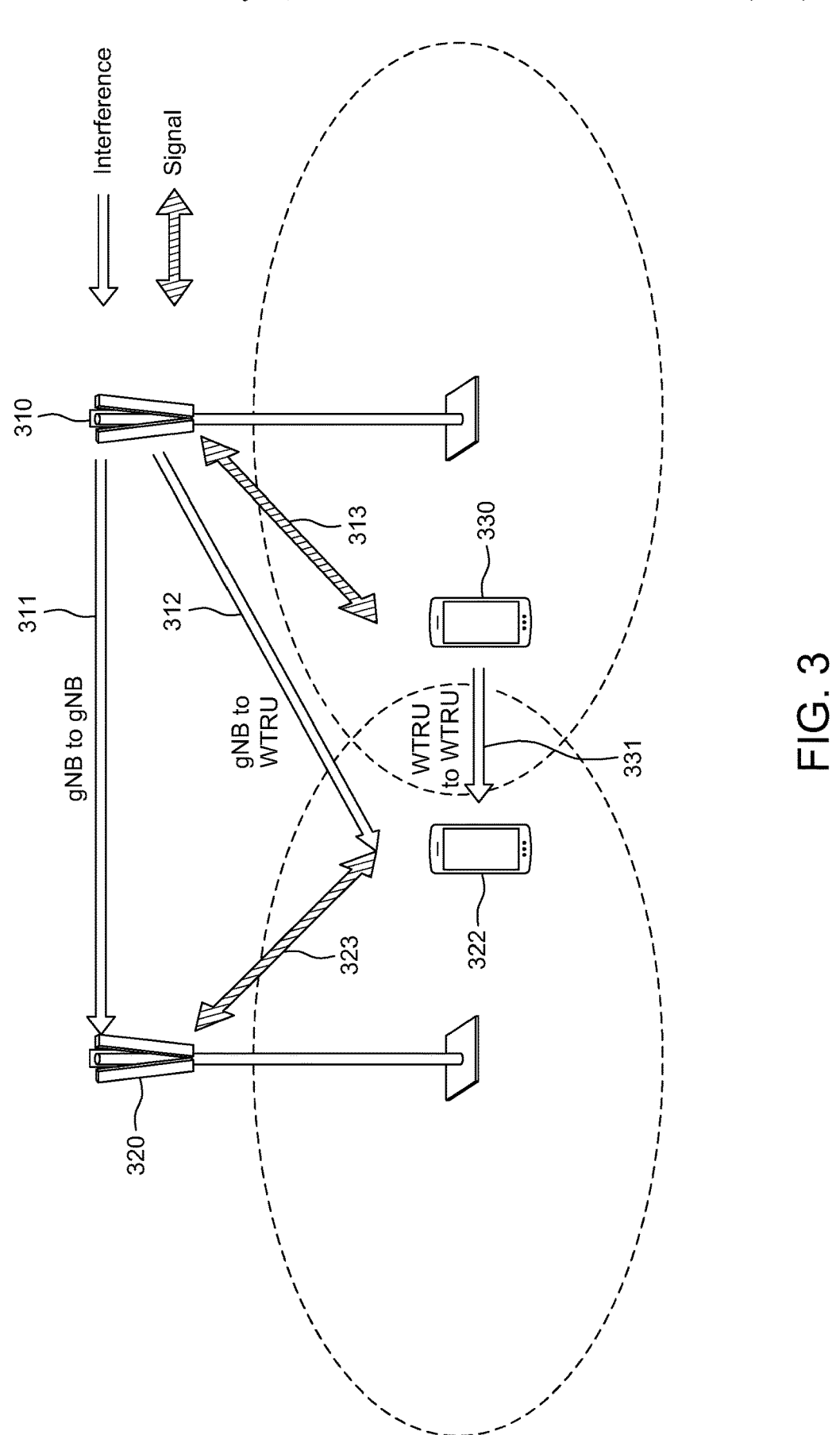
Figure 4A:
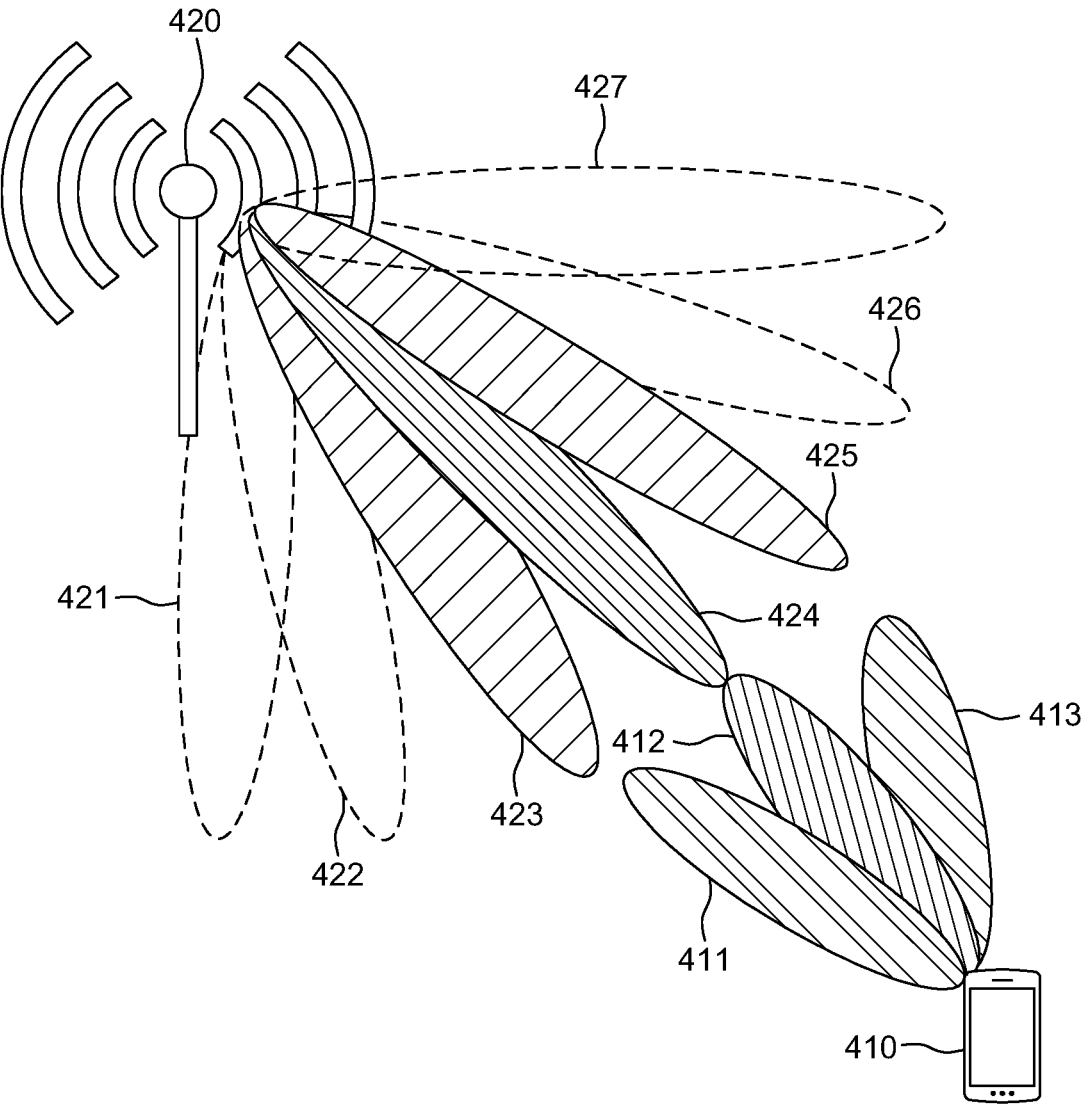
Figure 4B:
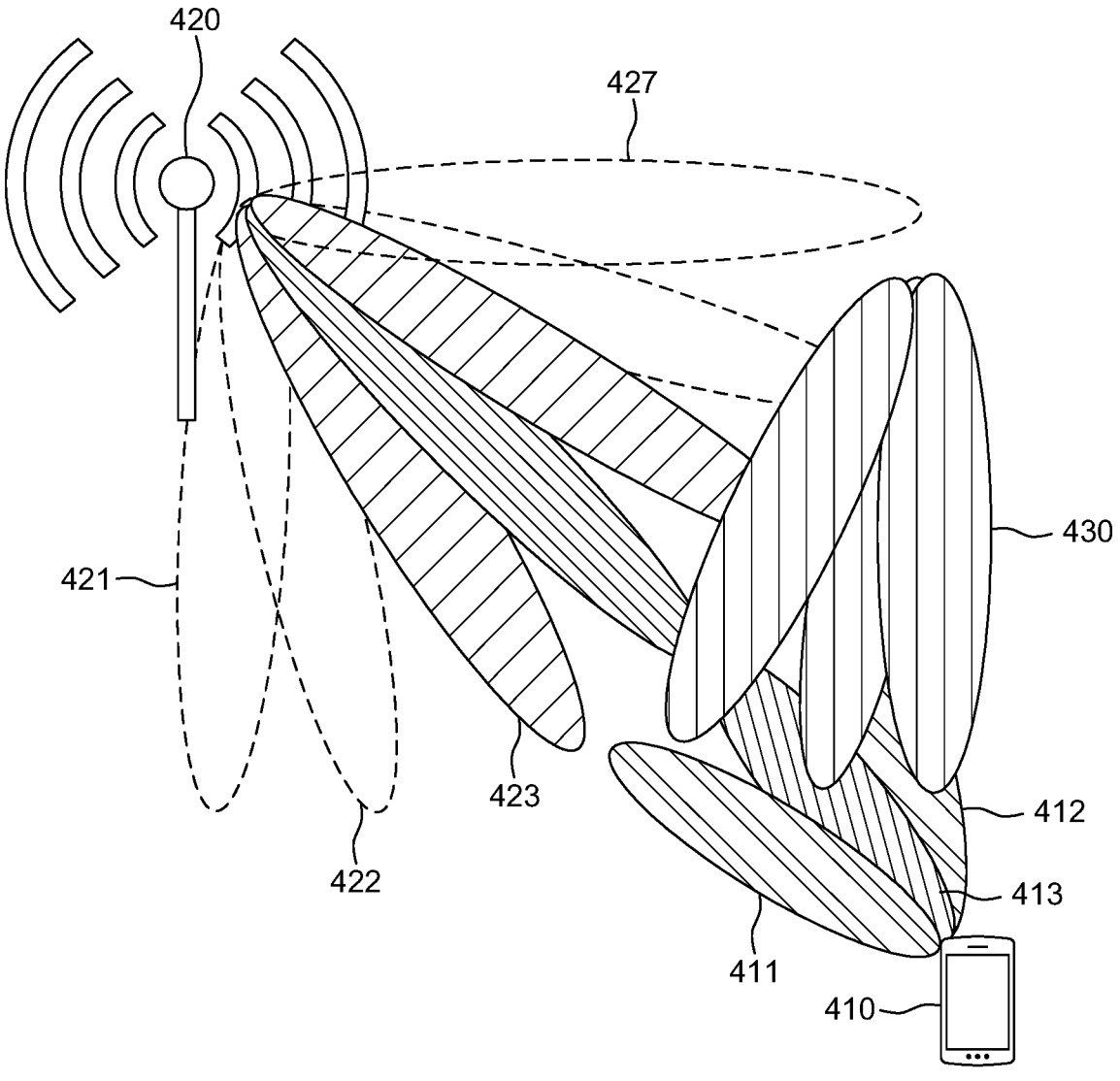
Figure 4C:
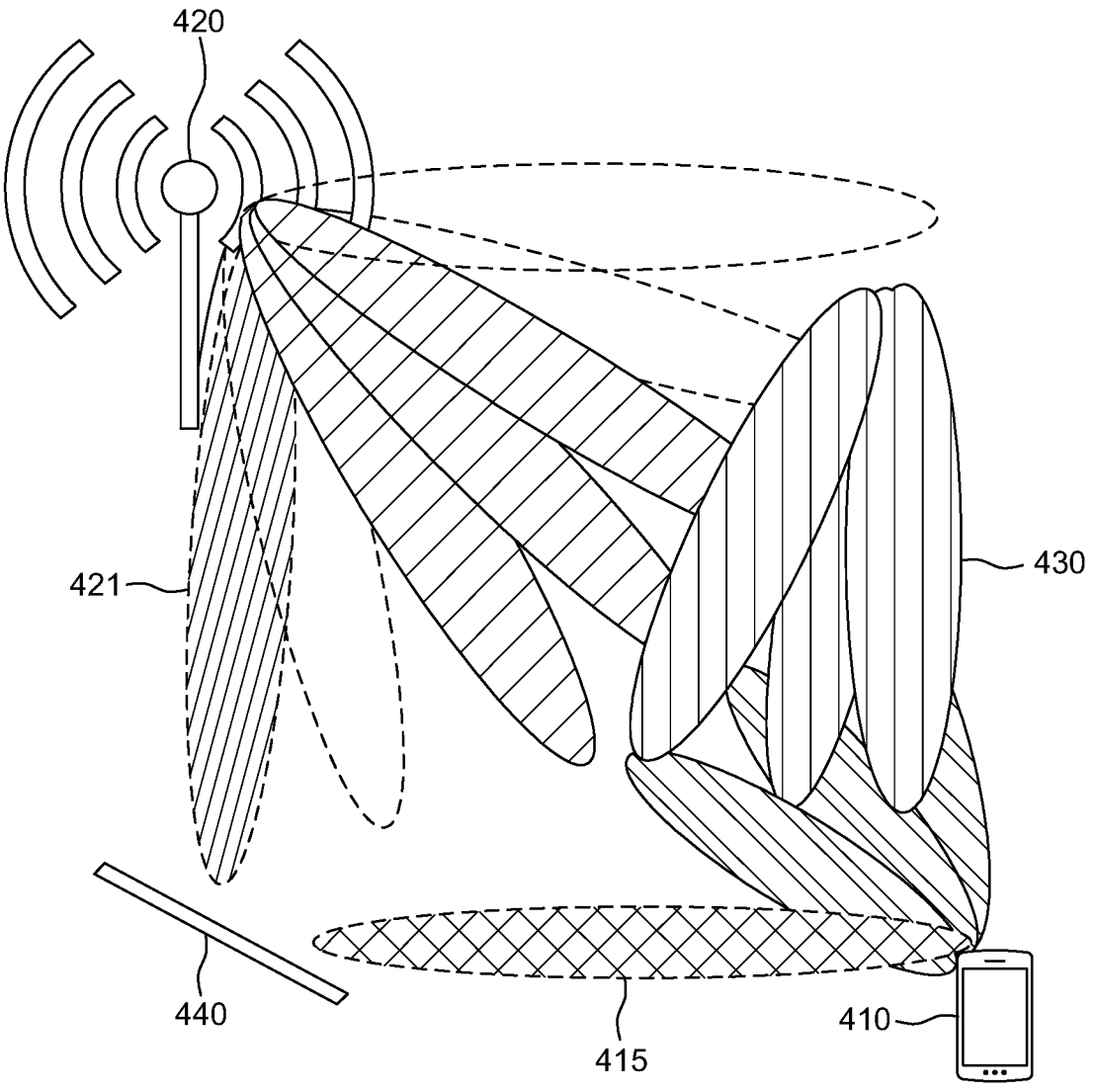
Figure 5:
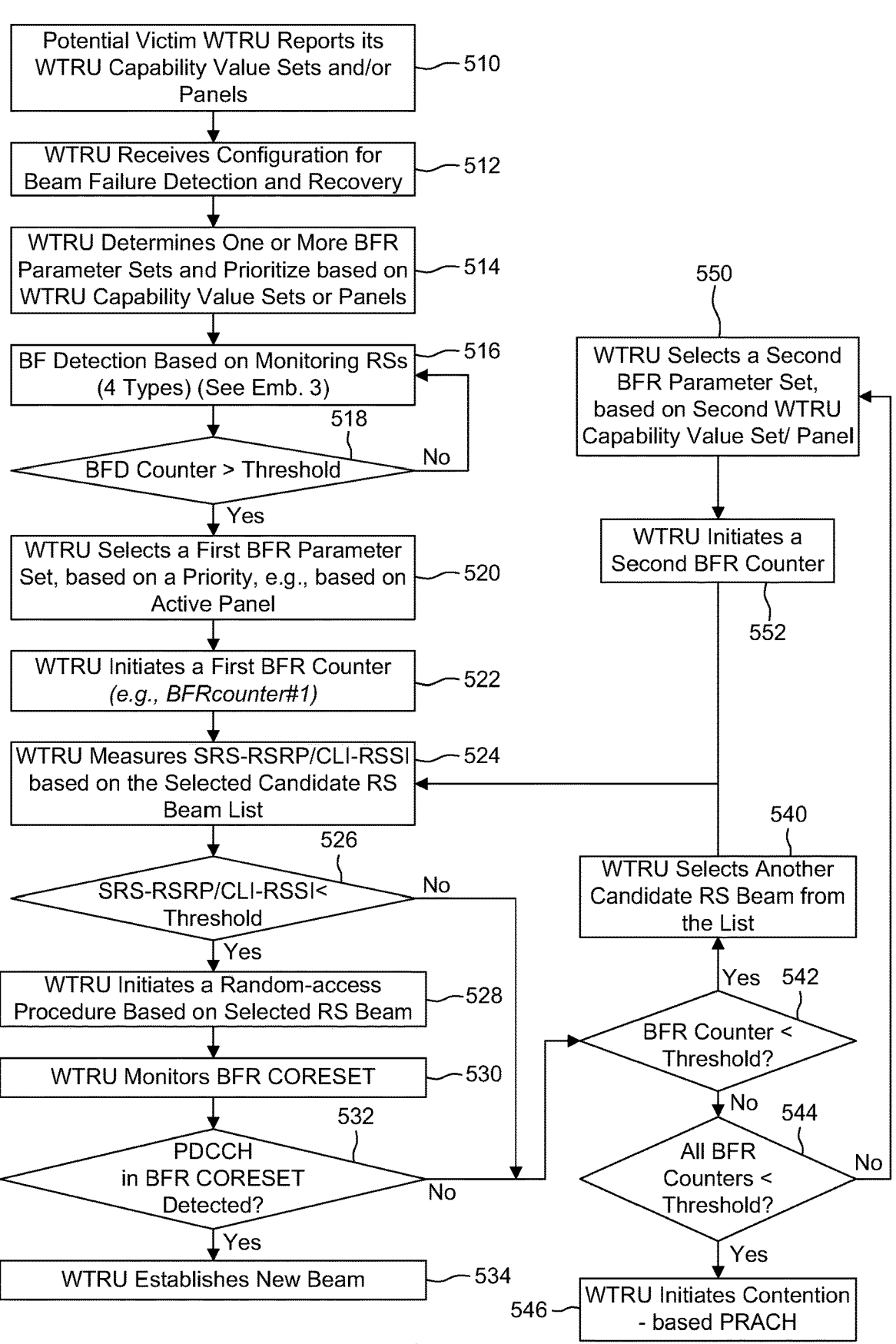
Figure 6:
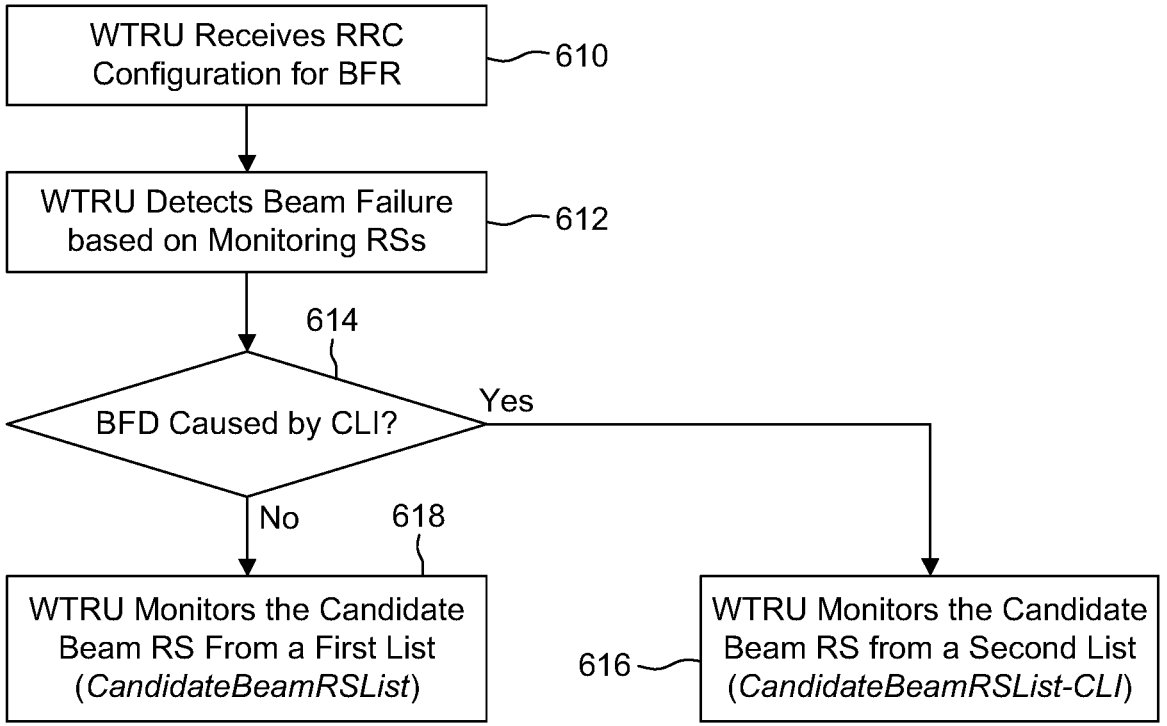

that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 2 is a diagram illustrating cross division duplexing;

FIG. 3 is a diagram illustrating CLI between gNBs and WTRUs;

FIG. 4A is a diagram illustrating an example of beam selection between a base station and WTRU;

FIG. 4B is a diagram illustrating an example of CLI between a base station and WTRU;

FIG. 4C is a diagram illustrating an example of CLI between a base station and WTRU;

FIG. 5 is a diagram illustrating an example procedure;

FIG. 6 is a diagram illustrating an example procedure; and

FIG. 7 is a diagram illustrating an example procedure.

DETAILED DESCRIPTION

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
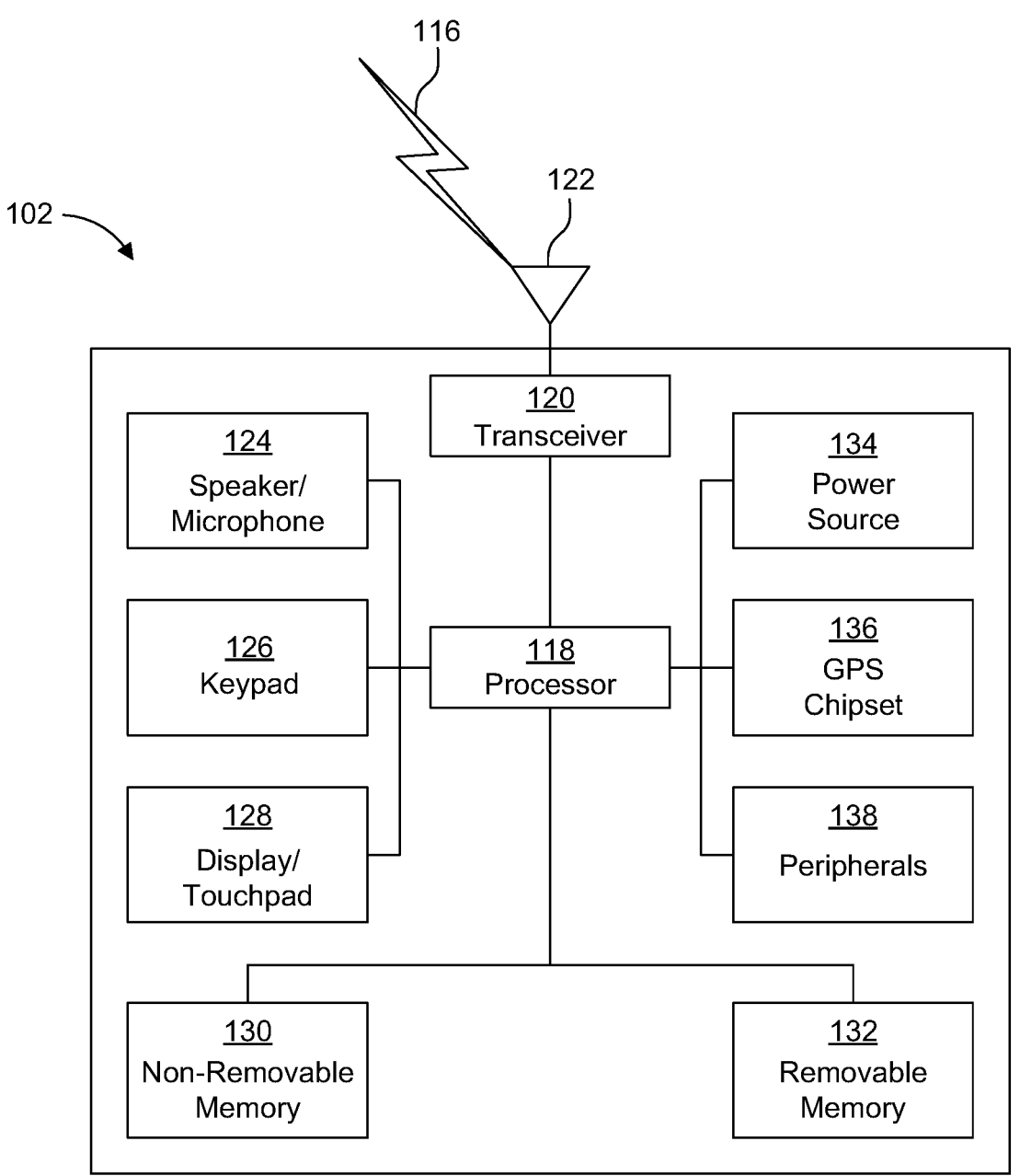
FIG. 1B is a system diagram illustrating an example wireless transmit/receive unit (WTRU) that may be used within the communications system illustrated in FIG. 1A according to an embodiment.
Figure 1C:
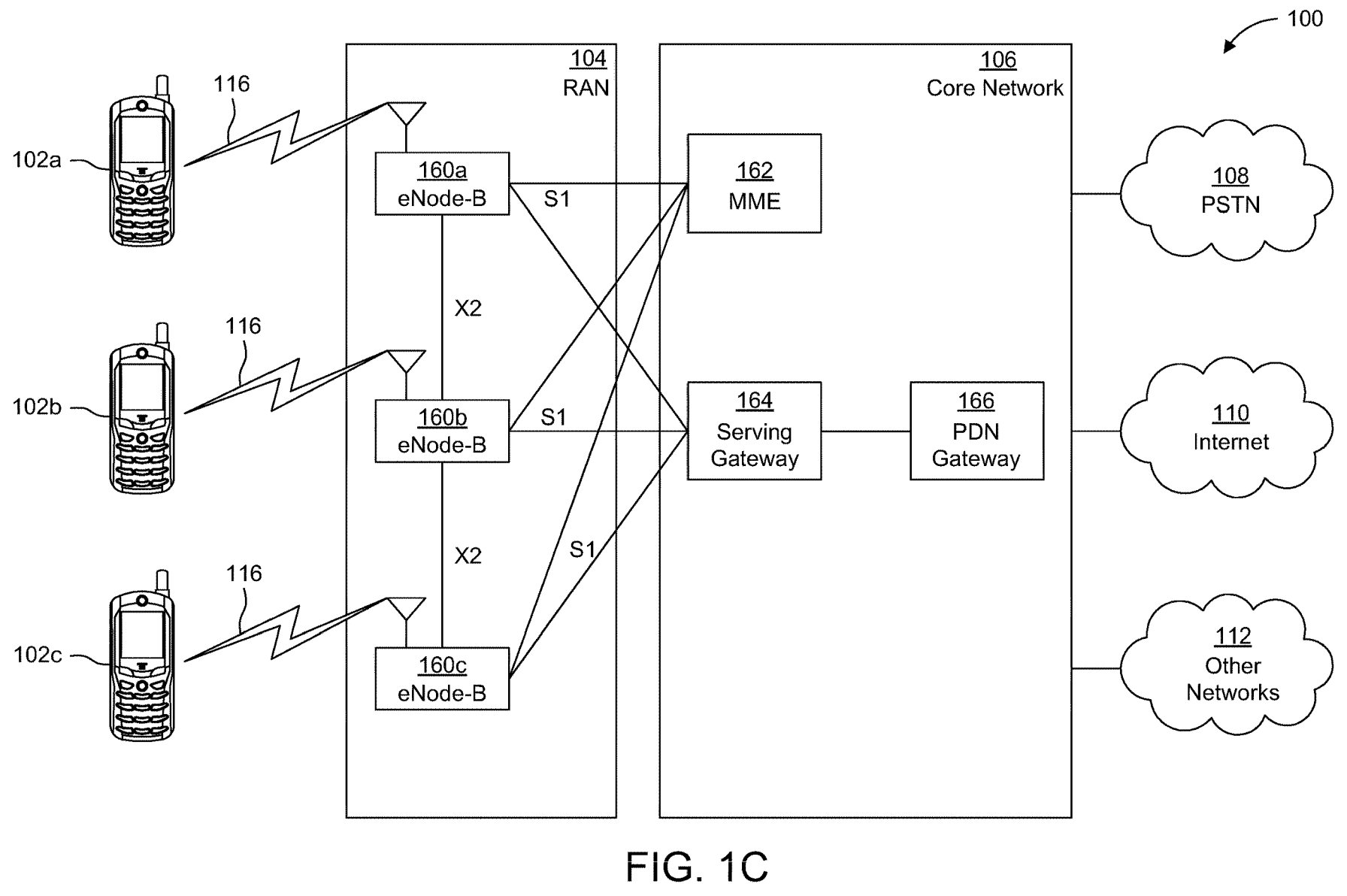

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU

102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Acronyms and abbreviations as used in the preceding and following paragraphs may be defined as follows:
Δf Sub-carrier spacing
gNB NR NodeB
AP Aperiodic
BFR Beam Failure Recovery
BFD-RS Beam Failure Detection-Reference Signal
BLER Block Error Rate
BWP Bandwidth Part
CA Carrier Aggregation
CB Contention-Based (e.g. access, channel, resource)
CCA Clear Channel Assessment
CDM Code Division Multiplexing
CG Cell Group
CLI Cross Link Interference
COMP Coordinated Multi-Point transmission/reception
COT Channel Occupancy Time
CP Cyclic Prefix
CPE Common Phase Error
CP-OFDM Conventional OFDM (relying on cyclic prefix)
CQI Channel Quality Indicator
CN Core Network (e.g. LTE packet core or NR core)
CRC Cyclic Redundancy Check
CSI Channel State Information
CSI-RS Channel State Information-Reference Signal
CU Central Unit
D2D Device to Device transmissions (e.g. LTE Sidelink)
DC Dual Connectivity
DCI Downlink Control Information
DL Downlink
DM-RS Demodulation Reference Signal DRB Data Radio Bearer
DU Distributed Unit
EN-DC E-UTRA-NR Dual Connectivity
EPC Evolved Packet Core
FD-CDM Frequency Domain-Code Division Multiplexing
FDD Frequency Division Duplexing
FDM Frequency Division Multiplexing
ICI Inter-Cell Interference
ICIC Inter-Cell Interference Cancellation
IP Internet Protocol
LBT Listen-Before-Talk
LCH Logical Channel
LCID Logical Channel Identity
LCP Logical Channel Prioritization
LLC Low Latency Communications
LTE Long Term Evolution e.g. from 3GPP LTE R8 and up
MAC Medium Access Control
MAC CE Medium Access Control Control Element
NACK Negative ACK
MBMS Multimedia Broadcast Multicast System
MCG Master Cell Group
MCS Modulation and Coding Scheme
MIMO Multiple Input Multiple Output
MTC Machine-Type Communications
MR-DC Multi-RAT Dual Connectivity
NAS Non-Access Stratum
NCB-RS New candidate beam-Reference Signal
NE-DC NR-RAN-E-UTRA Dual Connectivity
NR New Radio
NR-DC Dual Connectivity with
OFDM Orthogonal Frequency-Division Multiplexing
OOB Out-Of-Band (emissions)
$P_{cmax}$ Total available WTRU power in a given transmission interval
Pcell Primary cell of Master Cell Group
PCG Primary Cell Group
PDU Protocol Data Unit
PER Packet Error Rate
PHY Physical Layer
PLMN Public Land Mobile Network
PLR Packet Loss Rate
PRACH Physical Random-Access Channel
PRB Physical Resource Block
PRS Positioning Reference Signal
Pscell Primary cell of a Secondary cell group
PSS Primary Synchronization Signal
PT-RS Phase Tracking-Reference Signal
QOS Quality of Service (from the physical layer perspective)
RAB Radio Access Bearer
RAN PA Radio Access Network Paging Area
RACH Random Access Channel (or procedure)
RAR Random Access Response
RAT Radio Access Technology
RB Resource Block
RCU Radio access network Central Unit
RF Radio Front end
RE Resource Element
RLF Radio Link Failure
RLM Radio Link Monitoring
RNTI Radio Network Identifier
RO Random Access Occasion
ROM Read-Only Mode (for MBMS)
RRC Radio Resource Control
RRM Radio Resource Management
RS Reference Signal RTT Round-Trip Time
SCG Secondary Cell Group
SCMA Single Carrier Multiple Access
SCS Sub-Carrier Spacing
SDU Service Data Unit
SOM Spectrum Operation Mode
SP Semi-persistent
SpCell Primary cell of a master or secondary cell group.
SRB Signaling Radio Bearer
SS Synchronization Signal
SRS Sounding Reference Signal
SSS Secondary Synchronization Signal
SUL Supplementary UpLink
SWG Switching Gap (in a self-contained subframe)
TB Transport Block
TBS Transport Block Size
TCI Transmission Configuration Index
TDD Time-Division Duplexing
TDM Time-Division Multiplexing
TI Time Interval (in integer multiple of one or more symbols)
TTI Transmission Time Interval (in integer multiple of one or more symbols)
TRP Transmission/Reception Point
TRPG Transmission/Reception Point Group
TRS Tracking Reference Signal
TRx Transceiver
UL Uplink
URC Ultra-Reliable Communications
URLLC Ultra-Reliable and Low Latency Communications
V2X Vehicular communications
WLAN Wireless Local Area Networks and related technologies (IEEE 802.xx domain)
XDD Cross Division Duplex Terms defined further herein may be referred to using various different notations. Hereinafter, 'a' and 'an' and similar phrases may be interpreted as 'one or more' and 'at least one'. Similarly, any term which ends with the suffix '(s)' may be interpreted as 'one or more' and 'at least one'. The term 'may' is to be interpreted as 'may, for example'.

A beam may be defined as follows. A WTRU may transmit or receive a physical channel transmission or reference signal according to at least one spatial domain filter. The term "beam" may be used to refer to a spatial domain filter.

A WTRU may transmit a physical channel transmission or signal using the same spatial domain filter as the spatial domain filter used for receiving an RS (such as CSI-RS) or a SS block. The WTRU transmission may be referred to as a "target", and the received RS or SS block may be referred to as a "reference" or "source". In such case, the WTRU may be said to transmit the target physical channel or signal according to a spatial relation with a reference to such RS or SS block.

A WTRU may transmit a first physical channel transmission or signal according to the same spatial domain filter as the spatial domain filter used for transmitting a second physical channel transmission or signal. The first and second transmissions may be referred to as "target" and "reference" (or "source"), respectively. In such case, the WTRU may be said to transmit the first (target) physical channel or signal according to a spatial relation with a reference to the second (reference) physical channel or signal.

A spatial relation may be implicit, configured by RRC or signaled by a MAC CE or DCI, or another logically equivalent message. For example, a WTRU may implicitly transmit a PUSCH transmission and a DM-RS of the PUSCH according to the same spatial domain filter as an SRS indicated by an SRI (which may be indicated in DCI or configured by RRC or another logically equivalent message or transmission). In some examples, a spatial relation may be configured by RRC for an SRS resource indicator (SRI) or signaled by MAC CE for a PUCCH, or by other logically equivalent means. Such spatial relation may also be referred to as a "beam indication".

A WTRU may receive a first (target) downlink channel transmission or signal according to the same spatial domain filter or spatial reception parameter as a second (reference) downlink channel or signal. For example, such association may exist between a physical channel such as PDCCH or PDSCH and its respective DM-RS. At least when the first and second signals are reference signals, such association may exist when the WTRU is configured with a quasi-colocation (QCL) assumption type D between corresponding antenna ports. Such association may be configured as a TCI (transmission configuration indicator) state. A WTRU may be indicated an association between a CSI-RS or SS block and a DM-RS by an index to a set of TCI states configured by RRC and/or signaled by MAC CE. Such indication may also be referred to as a "beam indication".

Terms relating to TRPs may be used herein as follows. Hereafter, a TRP (e.g., transmission and reception point) may be interchangeably used with one or more of a TP (transmission point), a RP (reception point), a RRH (radio remote head), a DA (distributed antenna), a BS (base station), a sector (of a BS), and/or a cell (e.g., a geographical cell area served by a BS), but still consistent with the description provided herein. Hereafter, the term Multi-TRP may be interchangeably used with one or more of MTRP, M-TRP, and multiple TRPs, but still consistent with the description provided herein.

Hereinafter, the term "panel" may be used to refer to an anenna panel.

Hereinafter, the term "subband" and/or "sub-band" is used to refer to a frequency-domain resource and may be characterized by at least one of the following: a set of resource blocks (RBs); a set of resource block sets (RB sets), e.g. when a carrier has intra-cell guard bands; a set of interlaced resource blocks; a bandwidth part, or portion thereof; or a carrier, or portion thereof. For example, a subband may be characterized by a starting RB and number of RBs for a set of contiguous RBs within a bandwidth part. A subband may also be defined by the value of a frequency-domain resource allocation field and bandwidth part index.

Hereinafter, the term "XDD" may be used to refer to a subband-wise duplex scheme (e.g., either UL or DL being used per subband) and may be characterized by at least one of the following: a Cross Division Duplex (e.g., subband-wise FDD within a TDD band) scheme; a subband-based full duplex scheme (e.g., full duplex as both UL and DL are used/mixed on a symbol/slot, but either UL or DL being used per subband on the symbol/slot); a frequency-domain multiplexing (FDM) scheme of DL/UL transmissions within a TDD spectrum; a subband non-overlapping full duplex scheme (e.g., non-overlapped sub-band full-duplex); a full duplex other than a same-frequency (e.g., spectrum sharing, subband-wise-overlapped) full duplex scheme; or an advanced duplex method, e.g., other than (pure) TDD or FDD.

Hereinafter, the term "dynamic (/flexible) TDD" may be used to refer to a TDD system/cell which may dynamically (and/or flexibly) change/adjust/switch a communication direction (e.g., a downlink, an uplink, or a sidelink, etc.) on a time instance (e.g., slot, symbol, subframe, and/or the like). In an example, In a system employing dynamic/flexible TDD, a component carrier (CC) or a bandwidth part (BWP) may have one single type among 'D', 'U', and 'F' on a symbol/slot, based on an indication by a group-common (GC)-DCI (e.g., format 2_0) comprising a slot format indicator (SFI), and/or based on tdd-UL-DL-config-common/dedicated configurations. On a given time instance/slot/symbol, a first BS (e.g., cell, TRP) employing dynamic/flexible TDD may transmit a downlink signal to a first WTRU being communicated/associated with the first BS based on a first SFI and/or tdd-UL-DL-config configured/indicated by the first BS, and a second BS (e.g., cell, TRP) employing dynamic/flexible TDD may receive an uplink signal transmitted from a second WTRU in communication/associated with the second BS based on a second SFI and/or tdd-UL-DL-config configured/indicated by the second BS. In some examples, the first WTRU may determine that the reception of the downlink signal is being interfered by the uplink signal, where the interference caused by the uplink signal may refer to a WTRU-to-WTRU cross-link interference (CLI).

A WTRU may report a subset of channel state information (CSI) components, where CSI components may correspond to at least a CSI-RS resource indicator (CRI), a SSB resource indicator (SSBRI), an indication of a panel used for reception at the WTRU (such as a panel identity or group identity), measurements such as L1-RSRP, L1-SINR taken from SSB or CSI-RS (e.g. cri-RSRP, cri-SINR, ssb-Index-RSRP, ssb-Index-SINR), and other channel state information such as at least rank indicator (RI), channel quality indicator (CQI), precoding matrix indicator (PMI), Layer Index (LI), and/or the like.

Various aspects of beam quality monitoring/radio link monitoring are described herein. A WTRU may use/receive/or be configured with one or more sets of reference signals per BWP for monitoring and detecting the beam failure detection. For example, the term q0 may be used for the beam failure detection set. In another example, the terms q0,0 or q0,1 may be used as the beam failure detection sets. The beam failure detections sets (e.g., set q0, q0,0, or q0,1) may include one or more reference signals, wherein the reference signals may be CSI-RS resource configuration indexes and/or SS/PBCH block (SSB) indexes. The reference signals included in beam failure detection RS sets may be the same the reference signals configured/used/received for Radio Link Monitoring (RLM).

If a WTRU is not provided/configured with beam failure detection RS sets for a BWP (e.g., set q0, q0,0, or q0,1), the WTRU may determine the respective RS sets. For example, the WTRU may determine the RS signals to be included in a beam failure detection RS set for a BWP based on the periodic CSI-RS resource configuration indexes that the WTRU uses for monitoring for PDCCH transmissions in the respective CORESETs as indicated by TCI-state.

The WTRU may measure the reference signals included in beam failure detection RS sets and estimate radio link quality accordingly. The WTRU may use one or more thresholds/ranges for monitoring and estimating the radio link quality. For example, an out-of-sync threshold (e.g., Q_out) and/or an in-sync threshold (e.g., Q_in) may be used, wherein the thresholds Q_out and/or Q_in may be used for estimating the quality of the radio link and/or respective beam. The terms Q_out and Q_in may be used to represent one or more attributes and parameters and the respective values.

The threshold Q_out may be used to determine the radio link and/or beam quality for which the signal transmission may not be reliably received, corresponding to, for example, an out-of-sync block error rate (BLER_out). Alternatively, or additionally, the threshold Q_in may be used to determine the radio link and/or beam quality for which the signal transmission may be received reliably, corresponding to in-sync block error rate (BLER_in). The BLER_out and/or BLER_in may be explicitly determined by a BS.

In case BLER_out and/or BLER_in are not explicitly determined by a BS, they may be estimated based on one or more parameters. For example, the WTRU may use, receive, or be configured with PDCCH transmission parameters for performing the out-of-sync and/or in-sync evaluations. In some examples, the number of control OFDM symbols, aggregation level, ratio of hypothetical PDCCH RE energy to average SSS RE energy, ratio of hypothetical PDCCH DMRS energy to average SSS RE energy, BWP in number of PRBs, subcarrier spacing, and so forth may be used for determining the BLER_out and/or BLER_in thresholds.

An example of PDCCH transmission parameters that may be included in evaluating the Q_out and Q_in thresholds is shown in Table 1 and Table 2, respectively. Such tables may provide non-limiting examples of the parameters that may be included in evaluating the out-of-sync and in-sync thresholds. One or more of those parameters may be included. The values, number of PRBs, and choices for each parameter are examples. Other values, number of PRBs, or choices may be included.

TABLE 1

| Attribute | Value for BLER Configuration #0 |
| --- | --- |
| DCI format | 1-0 |
| Number of control OFDM symbols | 2 |
| Aggregation level (CCE) | 8 |
| Ratio of hypothetical PDCCH RE energy to average SSS RE energy | 4 dB |
| Ratio of hypothetical PDCCH DMRS energy to average SSS RE energy | 4 dB |
| Bandwidth (PRBs) | 24 |
| Sub-carrier spacing (kHz) | SCS of the active DL BWP |
| DMRS precoder granularity | REG bundle size |
| REG bundle size | 6 |
| CP length | Normal |
| Mapping from REG to CCE | Distributed |

TABLE 2

| Attribute | Value for BLER Configuration #0 |
| --- | --- |
| DCI payload size | 1-0 |
| Number of control OFDM symbols | 2 |
| Aggregation level (CCE) | 4 |
| Ratio of hypothetical PDCCH RE energy to average SSS RE energy | 0 dB |
| Ratio of hypothetical PDCCH DMRS energy to average SSS RE energy | 0 dB |
| Bandwidth (PRBs) | 24 |
| Sub-carrier spacing (kHz) | SCS of the active DL BWP |
| DMRS precoder granularity | REG bundle size |
| REG bundle size | 6 |
| CP length | Normal |
| Mapping from REG to CCE | Distributed |

Various aspects of beam failure detection are described herein. A WTRU may monitor for beam failure detection RS sets in active BWPs. The WTRU may further estimate the beam/radio link quality and report the out-of-sync and/or in-sync status. In an example, a WTRU may measure the radio link quality (L1-RSRP) for SSB(s) and/or CSI-RS(s) in corresponding beam failure detection RS set. The WTRU may then compare the measurement with respective thresholds to determine, indicate, or detect if a beam failure instance (BFI) has occurred.

The WTRU may indicate, determine, or be configured with one or more beam failure detection (BFD) counters. As such, the WTRU may detect a beam failure by counting BFI indications. The WTRU may indicate, determine, or be configured with one or more of the following parameters: a BFI_Counter, which may be a counter used for counting the number of BFIs, which may be set to 0 initially and incremented per BFI detection; a BFI_Max_Count, which may be a maximum value for the BFI_Counter that may trigger the beam failure detection; or a BFD_Timer, which may be a timer that starts with the first BFI detection. Alternatively, or additionally, the parameter BFD_timer may refer to a time period that is accounted for in the determination of whether a beam failure has occurred. For example, the BFD_timer may define a time duration during which the WTRU monitors for the occurrence of one or more conditions. If the timer, or the time period, expires before the BFI_Counter reaches the BFI_Max_Count, the beam failure detection procedure is stopped.

The above parameters are non-limiting examples of parameters that may be included in beam failure detection. One or more of these parameters may be included. Other parameters may be included.

In some examples, if a BFI has occurred, the WTRU may start and/or restart the BFD_Timer (i.e., monitors for one or more conditions within a given time duration) and increment the BFI_Counter by 1. If the BFI_Counter reaches the BFI_Max_Count, the WTRU may initiate a beam failure recovery (BFR) procedure. Alternatively, or additionally, if the duration defined by the parameter BFD_Timer has expired and the BFI_Counter has not reached the BFI_Max_Count, the beam failure detection procedure may be considered to be successfully complete.

Further aspects of beam failure recovery are described herein. A WTRU may determine, indicate, or trigger beam failure recovery based on a beam failure detection procedure. The WTRU may indicate, determine, or be configured with one or more of the following parameters: a BFR_Timer, which may represent a time duration that starts with a beam failure recovery procedure; an RSRP_Threshold, which may be a threshold for RSRP used in beam failure recovery, a candidateBeamRSList, which may provide a list of candidate beam reference signal indexes to be monitored, measured, and selected during the beam failure recovery; power ramping parameters, which may include a power ramping step, received preamble target power, or others; or random access parameters, which may include PRACH parameters including a preamble index, SSB per RACH occasion, random access response window, PRACH configuration index, random access occasions and SSBs association mask index, and so forth.

A WTRU may use/receive/or be configured with one or more sets of reference signals per BWP for monitoring, measuring, and selecting as the resources for the beam failure recovery. For example, the term q1 may be used for the beam failure recovery set. In another example, the terms q1,0 or q1, 1 may be used as the beam failure recovery sets.

The beam failure recovery sets (e.g., set q1, q1,0, or q1,1) may include one or more reference signals, wherein the reference signals may be CSI-RS resource configuration indexes and/or SS/PBCH block (SSB) indexes. In some examples, the reference signals included in beam failure recovery RS sets may be based on candidateBeamRSList, that is configured as part of a BFR procedure.

A WTRU may initiate a beam failure recovery based on random-access procedure. In some examples, the WTRU may configure random-access parameters, begin monitoring for one or more conditions during a time duration defined by a parameter such as BFR_Timer, and apply the power ramping parameters. The WTRU may monitor and measure one or more of the reference signals from the candidate-BeamRSList. The WTRU may determine if at least one of the SSBs has SS-RSRP above respective RSRP_Threshold amongst the SSBs in candidateBeamRSList, or at least one of the CSI-RSs has CSI-RSRP above respective RSRP_Threshold amongst the CSI-RSs in candidate-BeamRSList. The WTRU may then select the respective reference signal as the candidate new beam/random-access resource for BFR procedure. For example, the term q_new may be used to present the new selected beam/random-access resource. The WTRU may perform a PRACH transmission in respective random-access resources and according to spatial relation with the periodic CSI-RS resource configuration or with SS/PBCH block associated/QCL-ed with index q_new.

Alternatively or additionally, if uplink channel resources (e.g., uplink shared channel resources (UL-SCH)) are available, a WTRU may initiate a MAC-CE (or a logically equivalent) beam failure recovery procedure. As such, the WTRU may generate the BFR MAC-CE or equivalent message and transmit the message using the respective uplink channel resources.

A WTRU may determine, identify, or be configured with one or more CORESETs corresponding to the random-access procedure for the respective beam failure recovery. In an example, the WTRU may monitor for a PDCCH transmission in a search space set for detection of a DCI format with respective CRC scrambled with a Radio Network Identifier (e.g., C-RNTI or MCS-C-RNTI). The WTRU may determine the same antenna port quasi-collocation parameters as the ones associated with index q_new for monitoring the PDCCH in a search space set and receiving the corresponding PDSCH transmission.

If a time duration provided by, for example, the parameter BFR_Timer has expired and a beam failure recovery procedure has not been accomplished successfully, the WTRU may trigger a link failure detection and follow with link failure recovery (LFR) procedures.

Channel and/or interference measurements are described herein. A WTRU may receive a synchronization signal/physical broadcast channel (SS/PBCH) block. The SS/PBCH block (SSB) may include a primary synchronization signal (PSS), secondary synchronization signal (SSS), and physical broadcast channel (PBCH). The WTRU may monitor, receive, or attempt to decode an SSB during initial access, initial synchronization, radio link monitoring (RLM), cell search, cell switching, and so forth.

A WTRU may measure and report channel state information (CSI), wherein the CSI for each connection mode may include or be configured with one or more of following parameters. For example, the WTRU may be configured with a CSI Report Configuration, which may include one or more of the following: a CSI report quantity, e.g., Channel Quality Indicator (CQI), Rank Indicator (RI), Precoding Matrix Indicator (PMI), CSI-RS Resource Indicator (CRI), Layer Indicator (LI), etc.; a CSI report type, e.g., aperiodic, semi persistent, periodic; a CSI report codebook configuration, e.g., Type I, Type II, Type II port selection, etc.; or a CSI report frequency.

The WTRU may be configured with a CSI-RS Resource Set, including one or more of the following CSI Resource settings: an NZP-CSI-RS Resource for channel measurement; an NZP-CSI-RS Resource for interference measurement; or a CSI-IM Resource for interference measurement.

The WTRU may be configured with NZP-CSI-RS Resources, including one or more of the following: an NZP CSI-RS Resource ID; a periodicity and offset; QCL info and TCI-state info; or a resource mapping, e.g., number of ports, density, CDM type, etc.

A WTRU may indicate, determine, or be configured with one or more reference signals. The WTRU may monitor, receive, and/or measure one or more parameters based on the respective reference signals. For example, one or more of the following may apply. The following parameters are non-limiting examples of the parameters that may be included in reference signal(s) measurements. One or more of these parameters may be included. Other parameters may be included.

Reference signal measurements may include an SS-RSRP. An SS reference signal received power (SS-RSRP) may be measured based on the synchronization signals (e.g., demodulation reference signal (DMRS) in PBCH or SSS). It may be defined as the linear average over the power contribution of the resource elements (RE) that carry the respective synchronization signal. In measuring the RSRP, power scaling for the reference signals may be required. In the case SS-RSRP is used for L1-RSRP, the measurement may be accomplished based on CSI reference signals in addition to the synchronization signals.

Reference signal measurements may include a CSI-RSRP. A CSI-RSRP may be measured based on the linear average over the power contribution of the resource elements (RE) that carry the respective CSI-RS. The CSI-RSRP measurement may be configured within measurement resources for the configured CSI-RS occasions.

Reference signal measurements may include an SS-SINR. An SS signal-to-noise and interference ration (SS-SINR) may be measured based on the synchronization signals (e.g., DMRS in PBCH or SSS). It may be defined as the linear average over the power contribution of the resource elements (RE) that carry the respective synchronization signal divided by the linear average of the noise and interference power contribution. In case SS-SINR is used for L1-SINR, the noise and interference power measurement may be accomplished based on resources configured by higher layers.

Reference signal measurements may include a CSI-SINR. A CSI-SINR may be measured based on the linear average over the power contribution of the resource elements (RE) that carry the respective CSI-RS divided by the linear average of the noise and interference power contribution. In case CSI-SINR is used for L1-SINR, the noise and interference power measurement may be accomplished based on resources configured by higher layers. Otherwise, the noise and interference power may be measured based on the resources that carry the respective CSI-RS.

Reference signal measurements may include an RSSI. A received signal strength indicator (RSSI) may be measured based on the average of the total power contribution in configured OFDM symbols and bandwidth. The power contribution may be received from different resources (e.g., co-channel serving and non-serving cells, adjacent channel interference, thermal noise, and so forth)

Reference signal measurements may include a CLI-RSSI. A Cross-link interference received signal strength indicator (CLI-RSSI) may be measured based on the average of the total power contribution in configured OFDM symbols of the configured time and frequency resources. The power contribution may be received from different resources (e.g., cross-link interference, co-channel serving and non-serving cells, adjacent channel interference, thermal noise, and so forth)

Reference signal measurements may include an SRS-RSRP. A sounding reference signal RSRP (SRS-RSRP) may be measured based on the linear average over the power contribution of the resource elements (RE) that carry the respective SRS.

As described herein, a property of a grant or assignment may include at least one of the following: a frequency allocation; an aspect of time allocation, such as a duration; a priority; a modulation and coding scheme; a transport block size; a number of spatial layers; a number of transport blocks; a TCI state, CRI or SRI; a number of repetitions; whether the repetition scheme is Type A or Type B; whether the grant is a configured grant type 1, type 2 or a dynamic grant; whether the assignment is a dynamic assignment or a semi-persistent scheduling (configured) assignment; a configured grant index or a semi-persistent assignment index; a periodicity of a configured grant or assignment; a channel access priority class (CAPC); and/or any parameter provided in a DCI, by MAC or by RRC (or by logically equivalent signaling) for the scheduling the grant or assignment.

As described herein, an indication by DCI may consist of at least one of the following: an explicit indication by a DCI field or by RNTI used to mask CRC of the PDCCH; and/or an implicit indication by a property such as DCI format, DCI size, CORESET or search space, aggregation level, first resource element of the received DCI (e.g., index of first Control Channel Element), where the mapping between the property and the value may be signaled by RRC or MAC or a logically equivalent message.

The term RS may be interchangeably used with one or more of RS resource, RS resource set, RS port and RS port group. RS may be interchangeably used with one or more of SSB, CSI-RS, SRS, and DM-RS.

Further context for the embodiments presented herein are described below. Cross division duplexing (XDD) may be implemented within a conventional TDD band as shown in FIG. 2. Such implementation of XDD may be subject to resolving key challenges raised due to cross-link interference (CLI). With reference to FIG. 3, in an XDD (or dynamic/flexible TDD) framework, a potential aggressor cell 310 may switch from UL to DL in communication 313 with a WTRU 330 or vice-versa, causing CLI 311 on potential victim BSs 320 and potential CLI 312, on WTRUs 322, interfering with communication 323 between a victim WTRU 322 and gNB 320. In the case of UL-to-DL CLI, the CLI 331 from aggressor WTRUs 330 may cause beam failure detection at the victim WTRUs 322. As such, the beam failure detection and recovery procedure, including the candidate RS beams may need to be selected and performed differently than in conventional BFR, as the effect of the interference caused by CLI is different from legacy beam detection and recovery. This may result in different WTRU behaviors in the case where beam failure is caused by CLI in XDD (or dynamic/flexible TDD).

FIGS. 4a-4c illustrate beam selection examples in the presence of CLI. In FIG. 4a, a WTRU 410 communicates with a base station 420 over a preferred beam pairing 424, 412. Other candidate beams for the WTRU are 411 and 413. Candidate beams for the base station are 423 and 425. Additional available base station beams 421, 422, 426 and 427 are also shown. FIG. 4B shows the effect of CLI 430 on the beam arrangement of FIG. 4A. FIG. 4C shows an example beam selection in the presence of CLI 430 that interferes with WTRU beams 411, 413, and 412 as shown in FIGS. 4A and 4B. As shown in FIG. 4C, the WTRU selects beam 415 and the base station selects beam 421 even though this would be a least preferred combination without the presence of CLI. In this example the selected beams 421, 415 work because they are reflected by object 440.

A summary of at least a few exemplary embodiments described in further detail is provided in the following paragraphs.

At least one embodiment may include panel switching mechanisms in BFR caused by CLI in XDD (or dynamic/flexible TDD). The following description is made with reference to FIG. 5. In such embodiments, at 510, a WTRU may report WTRU capability values (sets) that may include the number of panels (e.g., two panels). At 512, the WTRU may receive configuration information for BFR including a list of candidate RS beams (e.g., candidateBeamRSList), list of monitoring beams, BFR max counter threshold (e.g., MaxCount), a set of uplink resources, and so forth. At 514, the WTRU may determine one or more BFR parameter sets. The BFR parameter sets may include candidate RS beam lists (e.g., candidateBeamRSList #1 or candidate-BeamRSList #2), maximum counter thresholds (e.g., Max-Count #1 or MaxCount #2), SRS-RSRP thresholds (SRSrsrpThreshold #1 or SRSrsrpThreshold #2), CLI-RSSI threshold (CLIrssiThreshold #1 or CLIrssiThreshold #2), and so forth. The BFR parameter sets may be associated with WTRU capability values/sets/panels. For example, the candidateBeamRSList #1 may associated with WTRU capability set/panel 1 and candidateBeamRSList #2 may associated with WTRU capability set/panel 2. The candidate RS beam lists may be identified, e.g., explicitly (i.e., different/separate lists may be identified) or implicitly (i.e., the WTRU may group the candidate RS beams based on prioritization, (e.g., based on panel ID)).

The WTRU may monitor the beams in the monitoring list and if beam failure is detected above a threshold number of times, as indicated by decision point 518, the WTRU may determine if the BFD is due to CLI. If the BFD is due to CLI, one or more of the following may apply: at 520, the WTRU may select a first BFR parameter set, based on a priority (e.g., based on the active panel); at 522, the WTRU may initiate a first BFR counter (e.g., BFRcounter #1); and/or at 524 the WTRU may measure SRS-RSRP and/or CLI-RSSI based on a candidate RS beam selected in the first candidate RS beam list (e.g., candidateBeamRSList #1) and at 526 compare with the first thresholds (e.g., SRSrsrpThreshold #1 and/or CLIrssiThreshold #1). If the measured resources are lower than the respective thresholds, at 528, the WTRU may transmit a message indicating a beam failure recovery request (BFRR) (e.g., a PRACH transmission) using the selected candidate RS beam, followed by, at 530, monitoring for PDCCH transmission in BFR-CORESET and establishing the corresponding new beam pair link at 534. Otherwise, at 542, if the first BFR counter (e.g., BFRcounter #1) has not reached the first maximum counter threshold (e.g., Max-Count #1), at 540, the WTRU selects another candidate RS beam from the first list (e.g., candidateBeamRSList #1).

At 542, if the first BFR counter (e.g., BFRcounter #1) has reached the first maximum counter threshold (e.g., Max- Count #1), at 550, at 540, the WTRU may switch to the second BFR parameter set. One or more of the following conditions, steps, or procedures may be undertaken: a WTRU may reset the BFR counter or, at 552, initiate a second BFR counter (e.g., BFRcounter #2). At 524, the WTRU may measure a SRS-RSRP and/or CLI-RSSI based on a candidate RS beam selected in the second candidate RS beam list (e.g., candidateBeamRSList #2) and compare with the second thresholds (e.g., SRSrsrpThreshold #2 and/or CLIrssiThreshold #2).

If, at 526, the measured resources are lower than the respective thresholds, at 528, the WTRU may transmit a message indicating a beam failure recovery request (BFRR) (e.g., a PRACH transmission) using the selected candidate RS beam, followed by, at 530, monitoring for PDCCH transmission in BFR-CORESET and establishing the corresponding new beam pair link.

Otherwise, if, at 544, the second BFR counter (e.g., BFRcounter #2) has not reached the second maximum counter threshold (e.g., MaxCount #2), the WTRU may at 550 select another candidate RS beam from the second list (e.g., candidateBeamRSList #2). If all BFR counters have reached the respective maximum counter threshold, the WTRU may switch to the contention-based random-access procedure at 546.

At least one embodiment, described herein with reference to FIG. 6, may concern independent candidate beam RS lists for beam failure recovery caused by CLI. In an exemplary embodiment, at 610, a WTRU may be configured with a first list (e.g., candidateBeamRSList) for legacy BFR, and a second candidate beam RS list (e.g., candidateBeamRSList-CLI) to be used in case BFR is caused by CLI in XDD (or dynamic/flexible TDD). The lists may include one or more indications of an SSB and/or CSI-RS that may be in different directions (e.g., the beams in candidateBeamRSList-CLI may be in different from directions affected by aggressor WTRUs).

In the case a BS that is in a DL subframe switches to UL, the BS may inform other BSs/WTRUs of the switch: for example, in the case there is inter-cell coordination, the aggressor BS may inform potential victim BSs through backhaul connections. Otherwise, in the case there is no inter-cell coordination, the aggressor BS may transmit a specific signal in a window. The WTRUs may monitor the signal and detect the switch. The BSs may monitor the signal and inform the WTRUs that they may be affected by the switch.

Upon detection of the BFR (at 612), the WTRU may determine, at 614, if it was due to CLI, e.g., based on combination of RSRP, L1-SINR, CLI-RSSI and/or SRS-RSRP, according to one or more methods or procedures described in further detail herein.

In case the BFR was caused by CLI, at 616, the WTRU may select an SSB or a CSI-RS among the second list of reference signals (e.g., candidateBeamRSList-CLI). The WTRU may then proceed with a beam failure recovery request. In case the BFR was not caused by CLI, at 618, the WTRU may select an SSB or a CSI-RS among the first list of reference signals (e.g., candidateBeamRSList. The WTRU may then proceed with a beam failure recovery request.

At least one embodiment may concern dynamic beam failure detection and recovery caused by CLI. In some embodiments, a WTRU may be configured to measure and report SRS-RSRP based on SRSs received from potential aggressor WTRUs. A SRS-RSRP report may be used at the BS for configuring and selecting candidate beam RS list in case the beam failure is caused by CLI (e.g., candidateBeamRSList-CLI or candidateBeamRSList #2 in WTRU capability set 2). The WTRU may further process the SRS-RSRP in power and/or beam direction aspects. The WTRU may determine the type of the BFD and whether it is caused due to CLI (based on a combination of Hypothetical PDCCH BLER, L1-RSRP, L1-SINR, CLI-RSSI, and/or SRS-RSRP measurements). In embodiments, the following BFD types may apply: BFD Type 1, where a hypothetical BLER>threshold, CLI<threshold; BFD Type 2 where a hypothetical BLER>threshold, CLI>threshold; BFD Type 3, where a hypothetical BLER<threshold, CLI>threshold; or BFD Type 4, where a hypothetical BLER<threshold, CLI<threshold.

The WTRU may report and/or recommend the candidate RS (SSB or CSI-RS) beams to be included in the candidate beam RS list in case the beam failure is caused by CLI (e.g., candidateBeamRSList-CLI or candidateBeamRSList #2 in WTRU capability set 2). The WTRU may determine the candidate RS beams based on combination of L1-RSRP and CLI measurements, for example. The WTRU may perform a selection of the best beam from the candidate RS beams and based on combination of L1-RSRP measurement and CLI measurement. If the WTRU determines that the BFR is due to the CLI and that the UL-SCH is available, WTRU generates and reports the BFR MAC CE to indicate the beam failure detection, the index to the SSB or CSI-RS with RSRP above the threshold, and so forth.

Panel switching mechanisms in BFR are described herein. A WTRU may determine and report respective WTRU capability values/sets (e.g., based on WTRU-panel related parameter(s). In some examples, the WTRU may include a parameter for the number of panels (e.g., two panels) which the WTRU may use for transmission and/or reception as WTRU capability value/set report. In some examples, the WTRU may include a parameter for the number of max supported layers (e.g., 4 layers) for a WTRU-panel (e.g., per WTRU-panel, or for all the WTRU-panels, etc.) as WTRU capability value/set report. In an example, the WTRU may include a parameter for the number of Tx chains (or Tx/Rx units, etc.) for a WTRU-panel (e.g., per WTRU-panel, or for all the WTRU-panels, etc.) as WTRU capability value/set report. In some examples, the WTRU may include a parameter for the number of max supported SRS ports (or configurable SRS ports) for a WTRU-panel (e.g., per WTRU-panel, or for all the WTRU-panels, etc.) as WTRU capability value/set report.

As used herein, the term WTRU-panel may be interchangeably used with one or more of WTRU antenna group, WTRU antenna port group, an entity/block/component capable of performing transmission and/or reception, and an entity/block/component capable of independent power control and/or timing control.

In accordance with the description provided herein, for example, a WTRU may use/have/employ, for example, two WTRU-panels (WTRU-panel1 and WTRU-panel2 for communication with a BS, e.g., which may be reported based on the WTRU capability value/set report), however the embodiments and processes discussed may equally be employed for cases with more than two WTRU-panels.

In embodiments, a WTRU may use/activate WTRU-panel1 for communications with a BS, e.g., based on an outcome/result of an initial access procedure, based on an indication/configuration from the BS, and/or based on an WTRU-initiated/oriented/driven/triggered active WTRU-panel selection. In some examples, using WTRU-panel1 for communications with the BS may imply that the WTRU may use WTRU-panel1 for at least one of the following: DL control channel reception, DL data/shared channel reception, DL RS reception, UL control channel transmission, UL data/shared channel transmission, and UL RS transmission.

The WTRU may determine, identify, or receive configuration information for beam failure monitoring and detection. The WTRU may measure beam quality based on a reference signal associated with the beam. For example, the WTRU may perform one or more of the following procedures. The WTRU may measure channel quality based on at least one of an SS-RSRP, CSI-RSRP, L1-RSRP, or other metrics. The WTRU may measure a power of interference based on at least one of SRS-RSRP, CLI-RSSI, CSI-RS interference measurement resources (IMR), or other metrics. The WTRU may measure the ratio of the channel to interference quality with at least one of SS-SINR, CSI-SINR, L1-SINR, and so forth. The WTRU may measure radio link quality based on PDCCH transmission parameters, a ratio of hypothetical PDCCH RE energy to average SSS RE energy (e.g., hypothetical BLER), and so forth. A WTRU may determine, identify, or receive configuration information for beam failure recovery (BFR). In some examples, the WTRU may receive configuration information for BFR including a list of candidate RS beams (e.g., candidateBeamRSList), BFR max counter threshold (e.g., MaxCount), a set of uplink resources, or other parameters.

In the following, parameters described in the above such as candidate RS beam list, maximum counter threshold, SS-RSRP threshold, CSI-RSRP threshold, SRS-RSRP threshold, and CLI-RSSI threshold may be referred to as BFR parameters. A specific combination of such parameters may be referred to as a "BFR parameter set".

In embodiments, a WTRU may use, define, determine, or be configured with one or more BFR parameter sets. The BFR parameter sets may include candidate RS beam lists (e.g., candidateBeamRSList #1 or candidateBeamRSList #2), maximum counter thresholds (e.g., MaxCount #1 or MaxCount #2), SRS-RSRP thresholds (SRSrsrpThreshold #1 or SRSrsrpThreshold #2), CLI-RSSI threshold (CLIrssi-Threshold #1 or CLIrssiThreshold #2), and so forth. Example embodiments are described below and with reference to FIG. 4.

In embodiments, BFR parameter sets may be associated with WTRU capability values, sets, and/or WTRU-panels. In some examples, the candidateBeamRSList #1 may be associated with (e.g., configured/indicated to be used along with) WTRU capability set/panel 1 and candidateBeamRSList #2 may be associated with (e.g., configured/indicated to be used along with) WTRU capability set/panel 2.

For an indication for the BFR parameter sets, one or more of the following methods may be used. With reference to FIG. 7, at 710, an explicit indication may be used in which a WTRU may receive configuration information indicating separate or different BFR parameter lists (e.g., based on association with WTRU capability values, sets, or WTRU-panels).

An implicit indication may be used in which a WTRU may receive configuration information indicating one or more BFR parameters, from which the WTRU may determine, define, or identify different or separate BFR parameter sets (e.g., each corresponding to each WTRU capability value, set, or WTRU-panel).

The WTRU may group the BFR parameters into BFR parameter sets based on prioritizations. In some examples, the WTRU may determine the prioritization based on, for example, the WTRU-panel ID associated with BFR parameters. As such, the WTRU may group the BFR parameters into BFR parameter sets based on the respective WTRU-panel ID. For example, the WTRU may determine the BFR parameter sets based on the candidate RS beams, wherein the WTRU may group the candidate RS beams based on prioritization, (e.g., based on WTRU-panel ID).

In some embodiments, a WTRU may monitor the reference signals from the beam failure detection set (e.g., q0 list), e.g., based on the WTRU-panel1 (as a currently activated/used WTRU-panel). At 712, in a case where a beam failure is detected, the WTRU triggers a beam recovery procedure.

Beam Recovery Procedures (BRPs) are described herein. A WTRU may determine a beam failure detection (e.g., based on the WTRU-panel1 (as a currently activated/used WTRU-panel)) and trigger a beam recovery procedure accordingly. The WTRU may determine if the beam failure detection was caused due to interfering signals (e.g., due to cross-link interference (CLI)), according to one or more schemes as described herein, where an effect of the CLI may degrade a (downlink) reception performance when receiving a downlink signal via (using) the WTRU-panel1.

One or more of the following conditions may apply. The WTRU may determine a first BFR parameter set (e.g., in response to determining that the first BFR parameter set is associated with the WTRU-panel1 (as a currently activated/used WTRU-panel). For example, with reference to FIG. 7, at 714, the WTRU may select the BFR parameter set (e.g., the first BFR parameter set) based on a prioritization (e.g., a panel ID of the panel that was actively being used when beam failure was detected).

The WTRU may determine, identify, or use the first candidate RS beam list from the first BFR parameter list (e.g., candidateBeamRSList #1). In some examples, a BS may configure/activate/indicate the first candidate RS beam list being associated with the WTRU-panel1, based on an efficient beam management strategy/procedure, e.g., based on a recent beam reporting from the WTRU informing the BS of one or more preferred RS beam indexes each with corresponding WTRU-panel ID (e.g., the WTRU capability value/set index) being reported together. In response to the recent beam reporting, the BS may activate/indicate/update the one or more preferred RS beam indexes to be comprised in the first candidate RS beam list being linked/associated with the WTRU-panel1 (e.g., via the WTRU capability value/set index, WTRU-panel ID, and/or the like). This may provide benefits in terms of beam management efficiency and improved robustness on beam failure related procedures in that, based on a configured/indicated BFR procedure, the BS may control the WTRU behavior on searching a preferred RS beam within the first candidate RS beam list, firstly.

The WTRU may initiate a first BFR counter (e.g., BFR-counter #1) based on the maximum counter threshold in the first BFR parameter set (e.g., MaxCount #1).

With reference to FIG. 7, at 716 the WTRU may select a candidate RS beam from the first candidate RS beam list. In an example, although the WTRU may be configured with more than one candidate RS beam list (e.g., each associated with each WTRU-panel), the WTRU may (be configured to) first search through/within a candidate RS beam list (e.g., the first candidate RS beam list) associated with a currently activated/used WTRU-panel (e.g., WTRU-panel1) and not search through/within a second candidate RS beam list firstly (e.g., if a WTRU-panel associated with the second candidate RS beam is not currently activated/used/prioritized, etc.). This may provide benefits in terms of beam management efficiency and improved robustness on beam failure related procedures in that, based on a configured/indicated BFR procedure, the BS may control the WTRU behavior on searching a preferred RS beam within the first candidate RS beam list, firstly.

The WTRU may measure the radio link and/or beam quality for the selected candidate RS beam (e.g., SS-RSRP, CSI-RSRP, a Signal-to-Interference-and-Noise-Ratio (SINR) value, SSB-based SINR, CSI-SINR, and so forth).

The WTRU may compare the channel quality measurements with respective channel/beam quality thresholds (e.g., SSB-RSRP threshold, CSI-RSRP threshold, a SINR threshold, a SSB-based SINR threshold, CSI-SINR threshold, and so forth) from the first BFR parameter list.

In some cases, if the measured channel/beam parameter is above the respective threshold (or in addition to the above measurement, or together with the above measurement, e.g., in order to be eventually combined together to determine an action (e.g., a candidate beam selection/report/request) during the BFR procedure), the WTRU may measure the interference based on the interference measurement reference signals and resources (e.g., at least one of SRS-RSRP, CLI-RSSI, CSI-RS interference measurement resources (IMR), a pre-defined/pre-configure interference measurement method based on a configured/indicated RS, and so forth). In some examples, the WTRU may measure the interference (i.e., SRS-RSRP) based on configured/indicated SRS signal(s)/configuration(s) and in the configured/indicated time and frequency resources. In an example, the configured/indicated SRS signal(s)/configuration(s) may correspond to an SRS being (e.g., to be) transmitted from a second WTRU (e.g., as a (potential) aggressor WTRU, a WTRU in a neighboring cell/TRP, etc.). This may provide benefits that such a CLI related measurement may be taken into account in deriving/selecting a preferred candidate beam as a part of BFR procedure. In some examples, the WTRU may measure the CLI-RSSI based on the configured reference signals and in the configured time and frequency resources. This may provide benefits in that the WTRU may apply/use the CLI-RSSI measurement, e.g., in terms of overall interference level including CLI effects, etc. in deriving/selecting a preferred candidate beam as a part of BFR procedure.

The WTRU may compare the channel quality measurement parameters and the interference measurement parameters. In some examples, the WTRU may compare the interference measurements with respective channel/beam interference thresholds (e.g., CLI-RSSI threshold, SRS-RSRP threshold, CSI-IMR thresholds, and so forth) from the first BFR parameter list In some examples, the WTRU may estimate a hypothetical measurement (e.g., hypothetical BLER), based on comparing the channel/beam quality measurements and the interference measurements (e.g., based on the ratio of the channel quality measurements to interference measurements)

With reference to FIG. 7, at 720, the WTRU may determine if the candidate beam is the preferred beam to be selected for performing the beam recovery procedure. The WTRU may report one or more of the preferred candidate beams. In embodiments, the indication may be by MAC-CE or CF-RACH. The WTRU may receive a confirmation message from a BS (e.g., by receiving a PDCCH in respective BFR CORESET), e.g., indicating that a beam is preferred or not preferred.

The WTRU may determine that the candidate beam is not the preferred beam. For example, the beam may not be selected as the preferred beam due to one or more of the following: low channel quality measurements, compared to respective thresholds; high interference measurements, compared to respective thresholds; a low ratio of the channel quality measurements to interference measurements, compared to respective thresholds; or a condition that the WTRU has not received the confirmation from BS on the reported preferred candidate beams (e.g., not receiving a PDCCH transmission via BFR CORESET, or another downlink signal, or upon expiration of a given time duration before receiving the confirmation, etc.)

The WTRU may determine a next candidate beam. One or more of the following steps may be undertaken. The WTRU may increment the first BFR counter (e.g., BFRcounter #1) by 1; the WTRU may compare the first BFR counter with the maximum counter threshold in the first BFR parameter set (e.g., MaxCount #1).

In case the first BFR counter has not reach the maximum counter threshold in the first BFR parameter set, the WTRU may determine and/or select another candidate RS beam from the first candidate RS beam list, as shown in FIG. 7, at 718.

The WTRU may measure the channel quality parameters and interference parameters based on applying at least one abovementioned behavior/procedure/step (e.g., based on abovementioned steps) for the selected candidate beam.

In case a BFR-related counter (e.g., the first BFR counter) has reached the maximum counter threshold in the first BFR parameter set, the WTRU may follow the procedure to search other candidate beam RSs (e.g., within a second candidate RS beam list, and/or applying the Automatic Panel Switching).

Methods for automatic panel switching are described herein. A WTRU may determine that a first BFR counter associated with the first BFR parameter set and/or a first WTRU-panel (e.g., BFRcounter #1) has reached the first maximum counter threshold (e.g., MaxCount #1). Therefore, the WTRU may determine to switch to the second BFR parameter set (e.g., a second WTRU-panel). One or more of the following steps or procedures may be undertaken.

The WTRU may determine, identify, or use the second candidate RS beam list from the second BFR parameter list (e.g., candidateBeamRSList #2).

The WTRU may reset the BFR counter or initiate a second BFR counter (e.g., BFRcounter #2) based on the maximum counter threshold in the second BFR parameter set (e.g., MaxCount #2), e.g., in response to the determining that the first BFR counter (e.g., associated with the first WTRU-panel) being reached a threshold (e.g., the first maximum counter threshold).

The WTRU may select a candidate RS beam from the second candidate RS beam list (e.g., associated with the second WTRU-panel, which may be based on at least one of the WTRU capability values/sets).

The WTRU may measure the radio link and/or beam quality for the selected candidate RS beam (e.g., SS-RSRP, CSI-RSRP, a SINR value, SSB-based SINR, CSI-SINR, and so forth).

The WTRU may compare the channel quality measurements with respective channel/beam quality thresholds (e.g., SSB-RSRP threshold, CSI-RSRP threshold, a SINR threshold, a SSB-based SINR threshold, CSI-SINR threshold, and so forth) from the second BFR parameter list.

If the measured channel/beam parameter(s) are above the respective threshold (or in addition to the above measurement, or together with the above measurement, e.g., in order to be eventually combined together to determine an action (e.g., a candidate beam selection/report/request) during the BFR procedure), the WTRU may measure the interference based on the interference measurement reference signals and resources (e.g., at least one of SRS-RSRP, CLI-RSSI, CSI-RS interference measurement resources (IMR), a pre-defined/pre-configured interference measurement method based on a configured/indicated RS, and so forth). In some examples, the WTRU may measure the SRS-RSRP based on configured/indicated SRS signal(s)/configuration(s) and in the configured/indicated time and frequency resources. In some examples, the configured/indicated SRS signal(s)/configuration(s) may correspond to an SRS being (e.g., to be) transmitted from a second WTRU (e.g., as a (potentially) aggressor WTRU, a WTRU in a neighboring cell/TRP, etc.). This may provide benefits that such a CLI related measurement may be taken into account in deriving/selecting a preferred candidate beam as a part of BFR procedure. In some examples, the WTRU may measure the CLI-RSSI based on the configured reference signals and in the configured time and frequency resources. This may provide benefits that the WTRU may apply/use the CLI-RSSI measurement, e.g., in terms of overall interference level including CLI effects, etc. in deriving/selecting a preferred candidate beam as a part of BFR procedure.

The WTRU may compare the channel quality measurement parameters and the interference measurement parameters. In some examples, the WTRU may compare the interference measurements with respective channel/beam interference thresholds (e.g., CLI-RSSI threshold, SRS-RSRP threshold, CSI-IMR thresholds, and so forth) from the second BFR parameter list. In some examples, the WTRU may estimate a hypothetical measurement (e.g., hypothetical BLER), based on comparing the channel/beam quality measurements and the interference measurements (e.g., based on the ratio of the channel quality measurements to interference measurements)

The WTRU may determine if the candidate beam is the preferred beam to be selected for performing the beam recovery procedure.

The WTRU may report one or more of the preferred candidate beams. The WTRU may receive a confirmation from a BS (e.g., by receiving a PDCCH in respective BFR CORESET, or by receiving another logically equivalent message). In response to receiving the confirmation, the WTRU may start to use or be configured to start to use (e.g., switch to, update to, and/or deactivate the first WTRU-panel and start to use, etc.) the second WTRU-panel for communications with the BS-based on (using) the candidate beam. Using the second WTRU-panel based on the candidate beam may comprise communicating with the BS based on a second spatial-domain filter being determined based on the candidate beam which may be included in the second candidate RS beam list and be confirmed by the BS based on the confirmation. This may provide benefits in terms of overhead and latency reduction with respect to WTRU-panel switching/selection procedure, in that the WTRU may change/switch its panel (from the first WTRU-panel to the second WTRU-panel) for communications with the BS, based on at least one embodiment or solution as described herein, e.g., without a separate/explicit WTRU-panel switching indication and/or procedure. This may provide benefits in the sense of automatic WTRU-panel switching.

The WTRU may determine that the candidate beam is not the preferred beam. For example, the beam may not be selected as the preferred beam due to one or more of the following: low channel quality measurements compared to respective thresholds; high interference measurements compared to respective thresholds; a low ratio of the channel quality measurements to interference measurements compared to respective thresholds, or in the event the WTRU does not receive the confirmation from BS on the reported preferred candidate beams (e.g., not receiving a PDCCH via BFR CORESET or another logically equivalent message, or in the event a given time duration expires before receiving the confirmation, etc.)

The WTRU may determine next candidate beam. One or more of the following steps or procedures may be undertaken. The WTRU may increment the second BFR counter (e.g., BFRcounter #2) by 1. The WTRU may compare the second BFR counter with the maximum counter threshold in the second BFR parameter set (e.g., MaxCount #2). In case the second BFR counter has not reach the maximum counter threshold in the second BFR parameter set, the WTRU may determine and/or select another candidate RS beam from the second candidate RS beam list. The WTRU may measure the channel quality parameters and interference parameters based on applying at least one abovementioned behavior/procedure/step (e.g., based on abovementioned steps) for the selected candidate beam.

In case the second BFR counter has reached the maximum counter threshold in the second BFR parameter set, the WTRU may follow the procedure for the contention-based random-access procedure.

Embodiments involving independent BFR parameter sets for beam failure recovery are described herein. In some embodiments, a WTRU may use, determine, or be configured with at least two BFR parameter sets and each BFR parameter set may be associated with a mode of operation. For example, a WTRU may use, determine, or identify the BFR parameters configuration based on a first BFR parameter set if WTRU determines and/or identifies a first mode of operation. Alternatively, or additionally, the WTRU may use, determine, or identify the BFR parameters configuration based on a second BFR parameter set if WTRU determines and/or identifies a second mode of operation. Parameters affecting a mode of operation are defined as follows.

The parameters may include a duplex mode (e.g., TDD, FDD, or XDD). For example, a WTRU may determine the BFR parameters based on a first BFR parameter set if the WTRU is operating in TDD mode. The WTRU may determine the BFR parameters based on a second BFR parameter set if the WTRU is operating in FDD mode. Moreover, the WTRU may determine the BFR parameters based on a third BFR parameter set if the WTRU is operating in XDD mode in a respective subband.

The parameters may include a cause of the BFD. For example, a WTRU may determine the BFR parameters based on a first BFR parameter set if the WTRU determines that the BFD was due to beam quality degradation (e.g., due to beams blocking). The WTRU may determine the BFR parameters based on a second BFR parameter set if the WTRU determines that the BFD was caused by interference signals (e.g., CLI in XDD).

The parameters may include a range of subbands. For example, a WTRU may determine the BFR parameters based on a first BFR parameter set if the WTRU determines that the WTRU is not affected/interfered by CLI in XDD operation in the respective subbands. The WTRU may determine the BFR parameters based on a second BFR parameter set if the WTRU determines that the WTRU may be affected/interfered by CLI from a potential aggressor cell, BS, and/or WTRU in XDD operation in the respective subbands.

The parameters may be determined based on a Beam Failure Recovery Procedure. For example, a WTRU may determine the BFR parameters based on a first BFR parameter set if the WTRU is operating full BFR procedure. The WTRU may determine the BFR parameters based on a second BFR parameter set if the WTRU is operating in partial BFR procedure.

The parameters may be based on a License Regime. For example, a WTRU may determine the BFR parameters based on a first BFR parameter set if the WTRU is operating with shared spectrum channel access. The WTRU may determine the BFR parameters based on a second BFR parameter set if the WTRU is operating without shared spectrum channel access.

The parameters may be based on a use case (e.g., sidelink, NTN, etc.). For example, a WTRU may determine the BFR parameters based on a first BFR parameter set if the WTRU determines a first use-case. The WTRU may determine the BFR parameters based on a second BFR parameter set if the WTRU determines a second use-case.

The parameters may be based on the barring of WTRU types (e.g., access baring of a certain WTRU types). For example, a first type of WTRUs (e.g., a WTRU with a limited capability including reduced Rx antenna, smaller maximum bandwidth supported, lower maximum transmission power) may determine the BFR parameters based on a first BFR parameter set if the WTRUs are not allowed to access a cell. Otherwise, the first type of WTRUs may determine the BFR parameters based on a second BFR parameter set if they are be allowed to access the respective cell.

The parameters may be based on one or more other parameters, for example, for a beam, a TCI, a TRP, and/or a WTRU-panel. For example, a WTRU may determine the BFR parameters based on a first BFR parameter set, in response to determining at least one of a first beam index, a first TCI, a first TRP index/ID, and/or a first WTRU-panel index/ID (e.g., based on at least one of the embodiments of this disclosure) is being associated with the first BFR parameter set (e.g., based on an explicit indication from a BS). The WTRU may determine the BFR parameters based on a second BFR parameter set, in response to determining at least one of a second beam index, a second TCI, a second TRP index/ID, and/or a second WTRU-panel index/ID (e.g., based on at least one of the embodiments of this disclosure) is being associated with the second BFR parameter set (e.g., based on an explicit indication from a BS).

The parameters may be based on support of a specific functionality in the network (e.g., power saving, carrier aggregation, DRX, etc.). For example, a WTRU may determine the BFR parameters based on a first BFR parameter set if the WTRU determines a first functionality in the network. The WTRU may determine the BFR parameters based on a second BFR parameter set if the WTRU determines a second functionality in the network.

In some examples, a WTRU may be configured with a first BFR parameter set that includes one or more first candidate beam failure recovery reference signal (CBFR-RS) lists (e.g., candidateBeamRSList). The WTRU may be configured with a second BFR parameter set that includes one or more second CBFR-RS lists (e.g., candidate-BeamRSList-CLI). In an example, the second BFR parameter set and the respective CBFR-RS list may be used in case BFD is caused by CLI in XDD. One or more of the following steps or procedures may be undertaken.

The WTRU may use, determine, or be configured with a first BFR parameter set with a first set q1 and a second BFR parameter set with a second set q1_CLI for a single TRP scheme, that are provided based on candidateBeamRSList and candidateBeamRSList_CLI, respectively. The WTRU may use, determine, or be configured with a first BFR parameter set including first two sets q1,0 and q1,1 for a multi-TRP scheme, that are provided based on candidate-BeamRSList1 and candidateBeamRSList2, respectively. The WTRU may use, determine, or be configured with a second BFR parameter set including, for example, second two sets q1,0_CLI and q1,1_CLI for a multi-TRP scheme, that may be provided based on candidateBeamRSList1_CLI and candidateBeamRSList2_CLI, respectively.

In some examples, a WTRU may be configured with a first BFR parameter set that includes one or more first parameters (e.g., maximum counter threshold (e.g., Max-Count), SRS-RSRP threshold (SRSrsrpThreshold), CLI-RSSI threshold (CLIrssiThreshold), and so forth). The WTRU may be configured with a second BFR parameter set that includes one or more second parameters (e.g., maximum counter threshold (e.g., MaxCount_CLI), SRS-RSRP threshold (SRSrsrpThreshold_CLI), CLI-RSSI threshold (CLIrssiThreshold_CLI), and so forth). In some examples, the second BFR parameter set may be used in case BFD is caused by CLI in XDD.

Embodiments involving a potential CLI indication are described herein. In some embodiments, a WTRU may determine if a potential cross-link interference (CLI) in a subband may impact the WTRU's beam and/or channel quality. For instance, the potential CLI may be due to the change in the direction of transmission in a neighboring cell in an XDD (or dynamic/flexible TDD) framework. For example, changing of the direction of signals' transmission from downlink (DL) to uplink (UL) in a neighboring cell may cause UL-to-DL CLI from potential aggressor WTRU(s) on the victim WTRU in the serving cell with DL transmission.

The WTRU may determine potential CLI based on, for example, explicit or implicit indications. In the case of an explicit indication, the WTRU may receive information indicating a trigger or an indication (e.g., via DCI, MAC-CE, or a logically equivalent message), that a potential CLI may exist or impact the WTRU's channel and/or beam quality in a respective subband. In some examples, a potential aggressor BS/cell may indicate to the serving BS/cell that the direction of transmission is going to change in a subband (e.g., via backhaul signaling in case inter-cell signaling exists).

In the case of an implicit indication, the WTRU may determine, identify, or receive an indication (e.g., via implicit signaling, DCI, MAC-CE, or a logically equivalent message), that a potential CLI may exist or impact the WTRU's channel and/or beam quality in a respective subband. In some examples, a potential aggressor BS/cell may transmit a (pre) configured signal in a window (e.g., in a time-domain and/or frequency-domain window), indicating that a change is taking place in the direction of transmission. The serving BS/cell may monitor and try to detect the (pre) configured signal. If a serving BS/cell detects the configured or pre-configured signal, the WTRU may receive information indicating a trigger or an indication from the serving cell that a potential CLI may exist or impact the WTRU's channel and/or beam quality in a respective subband.

In some cases, the WTRU may monitor and try to detect the (pre) configured signal. If the WTRU detects the (pre) configured signal, the WTRU may determine and/or identify that a potential CLI may exist or impact the WTRU's channel and/or beam quality in a respective subband.

Beam failure recovery procedures are further described herein. In some embodiments, a WTRU may determine that a BFR procedure is triggered. The WTRU may determine, identify, or be configured that a potential CLI may exist or impact WTRU's channel and/or beam quality in a respective subband. The WTRU may determine and/or identify if the BFR is caused by interfering signals (e.g., due to cross-link interference (CLI) in XDD), for instance, according to one or more methods or procedures as described herein. One or more of the following conditions, steps, or procedures may apply.

In some cases, if the WTRU determines that the BFD was caused due to interfering signals (e.g., due to cross-link interference (CLI) in XDD), the WTRU may determine a second BFR parameter set (e.g., corresponding to the parameter configurations due to CLI). In some cases, the WTRU may determine, identify, or use the second candidate RS beam list from the second BFR parameter list (e.g., candidateBeamRSList_CLI). In some cases, the WTRU may initiate a BFR counter (e.g., BFRcounter) based on the maximum counter threshold in the second BFR parameter set (e.g., MaxCount_CLI). In some cases, the WTRU may select a candidate RS beam from the second candidate RS beam list. In some cases, the WTRU may measure the radio link and/or beam quality for the selected candidate RS beam (e.g., SS-RSRP, CSI-RSRP, and so forth). In some cases, the WTRU may compare the channel quality measurements with respective channel/beam quality thresholds (e.g., SSB-RSRP_CLI, CSI-RSRP_CLI, and so forth) from the second BFR parameter list.

In some embodiments, if the measured channel/beam parameter is above the respective threshold, the WTRU may measure the interference based on the interference measurement reference signals and resources. In some examples, the WTRU may measure the channel quality (e.g., SRS-RSRP) based on the configured SRS signals and in the configured time and frequency resources. In some examples, the WTRU may measure the channel quality (e.g., CLI-RSSI) based on the configured reference signals and in the configured time and frequency resources.

The WTRU may compare the channel quality measurement parameters and the interference measurement parameters. In some examples, the WTRU may compare the interference measurements with respective channel/beam interference thresholds (e.g., SRSrsrpThreshold_CLI, CLIrssiThreshold_CLI, and so forth) from the second BFR parameter list. In some examples, the WTRU may estimate a hypothetical measurement (e.g., hypothetical BLER), based on comparing the channel/beam quality measurements and the interference measurements (e.g., based on the ratio of the channel quality measurements to interference measurements)

The WTRU may determine if the candidate beam is the preferred beam to be selected for performing the beam recovery procedure. The WTRU may report one or more of the preferred candidate beams. The WTRU may receive information confirming the preferred beam from a BS (e.g., by receiving a PDCCH in respective BFR CORESET, or another logicaly equivalent message). In response to receiving the confirmation, the WTRU may start to use or be configured to start to use (e.g., switch to, update to) the candidate beam for communications with the BS. The use of the candidate beam for communications with the BS may include communicating with the BS based on a second spatial-domain filter being determined based on the candidate beam, which may be included in the second candidate RS beam list and be confirmed by the BS based on the confirmation.

The WTRU may determine that the candidate beam is not the preferred beam. For example, the beam may not be selected as the preferred beam due to one or more of the following: low channel quality measurements, compared to respective thresholds; high interference measurements, compared to respective thresholds; low ratio of the channel quality measurements to interference measurements, compared to respective thresholds; or not receiving the confirmation from BS on the reported preferred candidate beams (e.g., not receiving a PDCCH via BFR CORESET, or another logically equivalent message).

The WTRU may determine the next candidate beam. One or more of the following conditions, steps, or procedures may apply or be undertaken. For instance, the WTRU may increment the BFR counter by 1. The WTRU may compare the BFR counter with the maximum counter threshold in the second BFR parameter set (e.g., MaxCount_CLI). In the case the BFR counter has not reach the maximum counter threshold in the second BFR parameter set, the WTRU may determine and/or select another candidate RS beam from the second candidate RS beam list. The WTRU may measure the channel quality parameters and interference parameters based on abovementioned steps for the selected candidate beam. In the case the BFR counter has reached the maximum counter threshold in the second BFR parameter set, the WTRU may follow a BFR procedure for the first BFR parameter set (e.g., based on one or more steps described herein for the selected candidate beam). In the case the BFR counter has reached the maximum counter threshold in all BFR parameter sets, the WTRU may follow the procedure for the contention-based random-access procedure.

Methods and procedures for dynamic beam failure detection and recovery are described herein.

Some embodiments for beam failure detection may account for a type of the BFD Identification. In some embodiments, a WTRU may determine if the BFD was caused due to interfering signals. For instance, when operating in XDD (or dynamic/flexible TDD) mode, the WTRU may determine if the BFD was caused due to the CLI from potential aggressor cell, BS, or WTRUs. The WTRU may perform measurements on reference signals (e.g., SSB and/or CSI-RS) to determine channel and/or beam quality (e.g., SS-RSRP, CSI-RSRP, SS-SINR, CSI-SINR, hypothetical BLER), in addition to interference signal quality/strength (e.g., CLI-RSSI, SRS-RSRP). The WTRU may compare the channel/beam measurement quality (CBMQ) with respective channel/beam measurement thresholds (CBMT). The WTRU may compare the interference measurement quality/strength (IMQ) with respective interference measurement thresholds (IMT).

In some embodiments, a WTRU may determine different types for the beam failure detections based on a combination of CBMQ and IMQ results and according to the respective thresholds. Therefore, the WTRU may determine one or more modes of operation and WTRU behaviour based on the determined BFD type. One or more of the following conditions, steps, or procedures may apply.

One type of BFD may be referred to as BFD Type 1. In the case of a type 1 BFD, the WTRU may determine the channel/beam quality is lower than the respective threshold, while the interference quality/strength is lower than corresponding threshold (e.g., CBMQ<CBMT and IMQ<IMT). The WTRU may determine the mode of operation accordingly. For example, the WTRU may determine that BFD may be caused due to reasons other than CLI from aggressor WTRUs or BSs in XDD mode. As such, the WTRU may initiate beam failure recovery procedure (e.g., random-access procedure) based on a first BFR parameter set that corresponds to beam failure caused by reasons other than interference and/or CLI.

Another type of BFD may be referred to as BFD Type 2. In the case of a type 2 BFD, the WTRU may determine the channel/beam quality is lower than the corresponding threshold, whereas the interference quality/strength is greater than or equal to respective acceptable threshold and/or out-of-sync indication (e.g., CBMQ<CBMT and IMQ>=IMT). The WTRU may determine the mode of operation accordingly. For example, the WTRU may determine that BFD may be caused due to CLI from aggressor WTRUs or BSs in XDD mode. As such, the WTRU may initiate a beam failure recovery procedure (e.g., random-access procedure) based on a second BFR parameter set that corresponds to beam failure caused by interference (e.g., CLI). In some examples, in the case the WTRU has determined that the BFD is due to interference (e.g., CLI), the WTRU may verify or determine if the uplink channel is available. In the case the WTRU determines that the uplink channel is available, the WTRU may initiate the BFD procedure accordingly (e.g., based on BFR MAC-CE, or another logically equivalent message)

Another type of BFD may be referred to as BFD Type 3. In the case of a type 3 BFD, the WTRU may determine the channel/beam quality is larger than or equal to respective threshold, whereas the interference quality/strength is greater than or equal to corresponding acceptable threshold (e.g., CBMQ>CBMT and IMQ>=IMT).

In embodiments, the WTRU may determine the mode of operation accordingly. In some embodiments, the WTRU may determine that BFD and/or partial BFD may be caused due to CLI from aggressor WTRUs or BSs in XDD mode. As such, the WTRU may initiate beam failure recovery procedure (e.g., random-access procedure) based on a second BFR parameter set that corresponds to beam failure caused by interference (e.g., CLI). In some examples, in case the WTRU has determined that the BFD is due to interference (e.g., CLI), the WTRU may verify or determine if the uplink channel is available. In case the WTRU determines that the uplink channel is available, the WTRU may initiate the BFD procedure accordingly (e.g., based on a BFR MAC-CE, or another logically equivalent message). Alternatively, or additionally, in some examples, the WTRU may measure, estimate, and/or determine the received power and the beam direction from which the interference (e.g., CLI) is received. As such, the WTRU may determine preferred BFR RS beam accordingly (e.g., dynamically). Then the WTRU may further report the preferred candidate BFR RS beam. Moreover, the WTRU may further use the information on the power and the beam direction from which the interference (e.g., CLI) is received. In an example, the WTRU may select, estimate, and/or determine the precoding matrix indication (PMI) in CSI-RS report accordingly.

Methods and procedures for candidate beam RS recommendation and/or reporting are described herein. In some embodiments, a WTRU may use the results from channel/beam measurement in addition to interference (e.g., CLI) measurement to dynamically recommend/report preferred and/or optimal BFR parameter sets (e.g., to the serving cell/BS), e.g., via a MAC-CE in the UL direction. As such, the WTRU may associate results from channel/beam measurements with interference measurements to determine a power/strength and/or beam direction of the potential interfering sources (e.g., CLI from aggressor cells, BSs, WTRUs in XDD mode).

In some examples, the WTRU may measure, estimate, and/or determine the beam direction of the potential interference (e.g., CLI) from aggressor cell, BS, and/or WTRUs. The WTRU may then refine, update, and/or recommend the candidate beam RE list (e.g., to the serving cell/BS) that is preferred to be used in case BFD is caused due to corresponding interfering signals (e.g., CLI).

In some embodiments, the WTRU may measure, estimate, and/or determine the power/strength and/or beam direction of the interfering signals to determine the best beam selection from the candidate RS beams in case the BFR is caused due to the interfering signals (e.g., CLI). As such, the WTRU may use the combination and/or association of the channel and interference measurements to select the best beam during the beam recovery procedure.

Methods and procedures for beam failure recovery based on a BFR MAC-CE, or other logically equivalent messages, are described herein. In some embodiments, a WTRU may verify and/or determine if the uplink channel in available during the beam failure recovery procedure. In some examples, during the beam failure recovery procedure, the WTRU may determine than the beam failure detection may be caused by interfering signals (e.g., CLI in XDD (or dynamic/flexible TDD) on the downlink channels/beams, e.g., in the respective subband. As such, the uplink channels (e.g., UL-SCH) may be available to be used by WTRU.

In some embodiments, if a WTRU determines that the uplink channels are available during channel recovery procedure, the WTRU may generate and send a message, such as a BFR MAC-CE, to indicate the beam failure detection. In an example, the message may include an indication of the index to the SSB and/or CSI-RS with RSRP above the threshold, and so forth.

Methods and procedures for subband-based CLI detection are described herein. A WTRU may be configured to monitor, estimate, and/or measure the reference signals from the beam failure detection set (e.g., q0 list).

In some embodiments, a WTRU may be configured with one or more subset of time and/or frequency masks (e.g., configurations, parameters, windows, references, and/or the like). In an example, the WTRU may use the time and/or frequency masks for determining one or more sets of subbands and/or time slots. As such, the WTRU may monitor, estimate, and/or measure the reference signals from the beam failure detection set (e.g., q0 list) based on the received, configured, or determined time and/or frequency masks.

In some embodiments, a WTRU may monitor, estimate, and/or measure the interference (e.g., CLI) on the sub-bands and/or time slots that are determined based on the time and/frequency masks. The WTRU may determine that beam failure is caused by interfering signals (e.g., CLI). In some examples, the WTRU may determine that the BFD is due to CLI, if quality/SINR of q0 over the resource mask is higher than quality/SINR of q0 plus a configured threshold. In some examples, the serving cell may configure the time and/or frequency masks as such no interference (e.g., CLI) exists over respective time and frequency resources.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of beam failure recovery (BFR) performed by a wireless transmit receive unit (WTRU) having a plurality of antenna panels, the method comprising:

receiving configuration information that includes a plurality of BFR parameter sets, wherein each BFR parameter set includes a respective set of candidate beam reference signals (RSs), a measurement criterion and a cross link interference (CLI) criterion;

initiating a beam failure recovery procedure including:

determining a first BFR parameter set from the plurality of BFR parameter sets based on a priority of the first BFR parameter set, wherein the priority of the first BFR parameter set is determined based on which panel of the plurality of antenna panels is active, or based on a received indication;

measuring CLI based on the respective set of candidate beam RSs from the determined first BFR parameter set;

determining that at least one candidate beam RS in the set of candidate beam RSs of the first BFR parameter set does not satisfy either the measurement criterion or the CLI criterion;

selecting a second BFR parameter set from the plurality of BFR parameter sets for which at least one candidate beam RS in the set of candidate beam RSs of the second BFR parameter set satisfies both the measurement criterion and the CLI criterion;

selecting a candidate beam RS in the set of candidate beam RSs of the second BFR parameter set that satisfies the measurement criterion and the CLI criterion; and transmitting an indication indicating the selected candidate beam RS.

2. The method of claim 1, wherein the measurement criterion is reference signal received power (RSRP).

3. The method of claim 1, wherein the CLI criterion is based on a crosslink interference received signal strength indicator (CLI-RSSI).

4. The method of claim 1, wherein on a condition that a first antenna panel of the plurality of antenna panels is active, the first BFR parameter set is associated with the first antenna panel, and the priority of the first BFR parameter set is a highest priority based on the first antenna panel being active.

5. The method of claim 1, further comprising transmitting a message indicating a number of available antenna panels.

6. The method of claim 1, wherein each BFR parameter set further includes at least one of: a list of beams for the WTRU to monitor, a BFR counter threshold, and a set of uplink resources.

7. The method of claim 1, wherein the WTRU is operating in a cross-division duplexing mode or a dynamic time division duplexing mode.

8. The method of claim 1, further comprising receiving a confirmation of the selected candidate beam RS.

9. The method of claim 1, further comprising determining that the WTRU does not receive a confirmation of the selected candidate beam, and selecting a second candidate beam RS and transmitting an indication indicating the selected second candidate beam RS.

10. A wireless transmit/receive unit (WTRU) comprising:

a plurality of antenna panels; and circuitry configured to:

receive configuration information that includes a plurality of beam failure recovery (BFR) parameter sets wherein each BFR parameter set includes a respective set of candidate beam reference signals (RSs), a measurement criterion and a cross link interference (CLI) criterion;

determine a first BFR parameter set from the plurality of BFR parameter sets based on a priority of the first BFR parameter set, wherein the priority of the first BFR parameter set is determined based on which panel of the plurality of antenna panels is active, or based on a received indication;

measure CLI based on the respective set of candidate beam RSs from the determined first BFR parameter set;

on a condition that at least one candidate beam RS in the set of candidate beam RSs of the first BFR parameter set does not satisfy either the measurement criterion or the CLI criterion:

select a second BFR parameter set from the plurality of BFR parameter sets for which at least one candidate beam RS in the set of candidate beam RSs of the second BFR parameter set satisfies both the measurement criterion and the CLI criterion;

select a candidate beam RS in the set of candidate beam RSs of the second BFR parameter set that satisfies the measurement criterion and the interference criterion; and transmit an indication indicating the selected candidate beam RS.

11. The WTRU of claim 10, wherein the measurement criterion is reference signal received power (RSRP).

12. The WTRU of claim 10, wherein the CLI criterion is based on a crosslink interference received signal strength indicator (CLI-RSSI).

13. The WTRU of claim 10, wherein on a condition that a first antenna panel of the plurality of antenna panels is active, the first BFR parameter set is associated with the first antenna panel, and the priority of the first BFR parameter set is a highest priority based on the first antenna panel being active.

14. The WTRU of claim 10, further configured to transmit a message indicating a number of available antenna panels.

15. The WTRU of the claim 10, wherein each BFR parameter set further includes at least one of: a list of beams for the WTRU to monitor, a BFR counter threshold, and a set of uplink resources.

16. The WTRU of claim 10, wherein the WTRU is configured to operate in a cross-division duplexing mode or a dynamic time division duplexing mode.

17. The WTRU of claim 10, further configured to receive a confirmation of the selected candidate beam RS.

18. The WTRU of claim 10, further configured to, on a condition that the WTRU does not receive a confirmation of the selected candidate beam, select a second candidate beam RS and transmit an indication indicating the selected second candidate beam RS.

* * * * *